United States Patent
Ito et al.

(10) Patent No.: US 10,004,990 B2
(45) Date of Patent: Jun. 26, 2018

(54) INFORMATION PROCESSING TERMINAL, NON-TRANSITORY STORAGE MEDIUM ENCODED WITH COMPUTER READABLE INFORMATION PROCESSING PROGRAM, INFORMATION PROCESSING TERMINAL SYSTEM, AND INFORMATION PROCESSING METHOD

(71) Applicant: NINTENDO CO., LTD., Kyoto-shi, Kyoto (JP)

(72) Inventors: Shinya Ito, Kyoto (JP); Tomohisa Kawakami, Kyoto (JP); Fumihiko Inoue, Kyoto (JP)

(73) Assignee: NINTENDO CO., LTD., Kyoto-shi (JP)

( * ) Notice: Subject to any disclaimer, the term of this patent is extended or adjusted under 35 U.S.C. 154(b) by 146 days.

(21) Appl. No.: 14/805,736

(22) Filed: Jul. 22, 2015

(65) Prior Publication Data
US 2016/0059128 A1    Mar. 3, 2016

(30) Foreign Application Priority Data
Aug. 28, 2014  (JP) ................. 2014-174405

(51) Int. Cl.
| | | |
|---|---|---|
| A63F 13/10 | (2006.01) | |
| A63F 13/52 | (2014.01) | |
| A63F 13/213 | (2014.01) | |
| A63F 13/525 | (2014.01) | |

(52) U.S. Cl.
CPC ........... *A63F 13/52* (2014.09); *A63F 13/213* (2014.09); *A63F 13/525* (2014.09)

(58) Field of Classification Search
CPC ....................................... A63F 13/10
See application file for complete search history.

(56) References Cited

U.S. PATENT DOCUMENTS

| | | | |
|---|---|---|---|
| 7,671,916 B2 * | 3/2010 | Hashimoto | H04N 7/181 250/206.1 |
| 2009/0303346 A1 | 12/2009 | Kanemitsu et al. | |
| 2011/0242289 A1 | 10/2011 | Fukushima et al. | |
| 2011/0244958 A1 | 10/2011 | Nimura et al. | |

(Continued)

FOREIGN PATENT DOCUMENTS

| | | |
|---|---|---|
| JP | 2000-050145 | 2/2000 |
| JP | 2002-182153 | 6/2002 |

(Continued)

OTHER PUBLICATIONS

Ehara et al, et al. U.S. Appl. No. 14/805,841, filed Jul. 22, 2015.

*Primary Examiner* — Omkar Deodhar
(74) *Attorney, Agent, or Firm* — Nixon & Vanderhye P.C.

(57) ABSTRACT

A hand-held information processing terminal includes a display, a camera arranged in proximity to the display and capable of obtaining an image of a user including infrared components, an estimation module that estimates relative positional relation between the display and the user based on the obtained image, a generation module that generates a plurality of display images in accordance with the relative positional relation, and a control module that provides stereoscopic display to the user in accordance with a position thereof with the use of the plurality of display images.

15 Claims, 35 Drawing Sheets

FIG.1

(56) References Cited

U.S. PATENT DOCUMENTS

| | | | |
|---|---|---|---|
| 2011/0304640 A1* | 12/2011 | Noge | G06T 19/006 345/589 |
| 2012/0108328 A1 | 5/2012 | Konno et al. | |
| 2012/0218259 A1* | 8/2012 | Takahashi | H04N 13/0275 345/419 |
| 2014/0035907 A1 | 2/2014 | Hasegawa et al. | |
| 2014/0307058 A1* | 10/2014 | Kirk | H04N 5/33 348/47 |
| 2015/0042679 A1* | 2/2015 | Jarvenpaa | G06T 19/006 345/633 |

FOREIGN PATENT DOCUMENTS

| | | |
|---|---|---|
| JP | 2003-289368 | 10/2003 |
| JP | 2008-5017 | 1/2008 |
| JP | 2009-296245 | 12/2009 |
| JP | 2011-211685 | 10/2011 |
| JP | 2011-215422 | 10/2011 |
| JP | 2011-215918 | 10/2011 |
| JP | 2012-023488 | 2/2012 |
| JP | 2012-174238 | 9/2012 |
| JP | 2014-045473 | 3/2014 |
| JP | 2014-511049 | 5/2014 |
| WO | WO 2012/109102 | 8/2012 |
| WO | WO 2013/099722 | 7/2013 |

\* cited by examiner

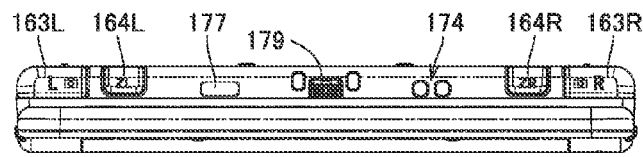
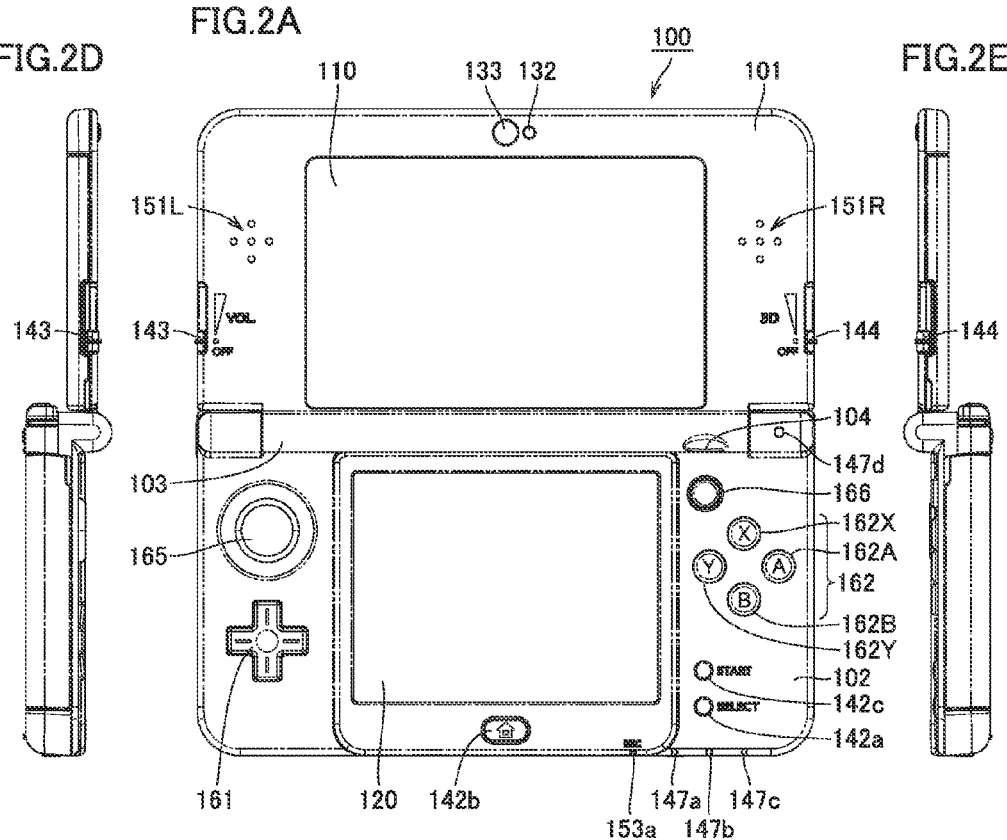
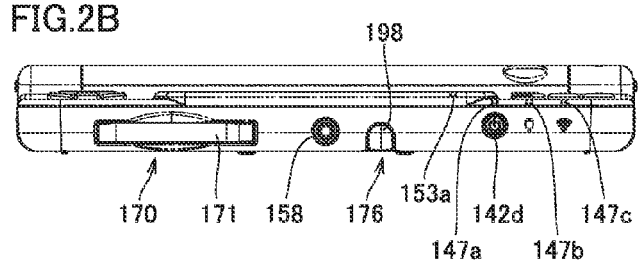

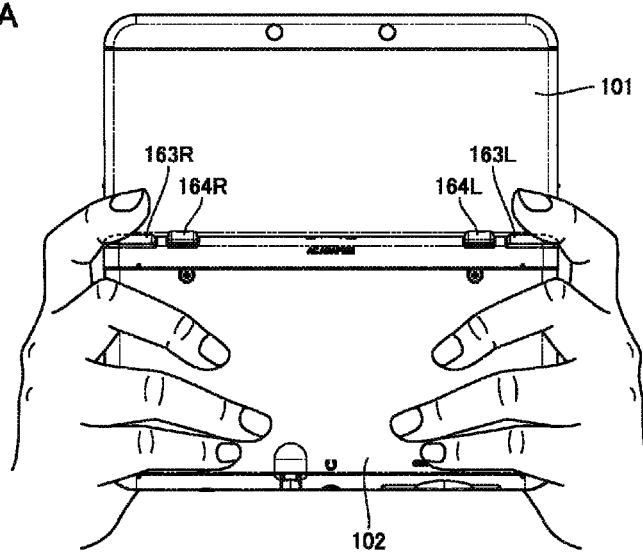
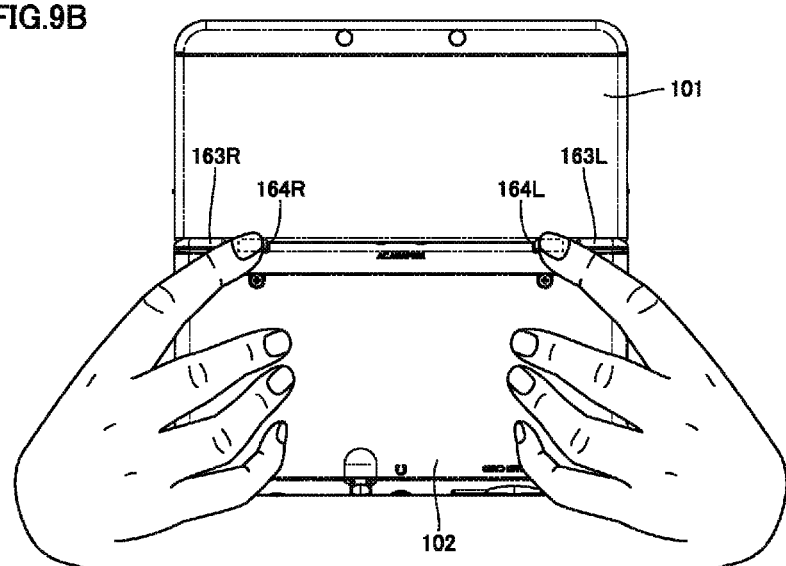

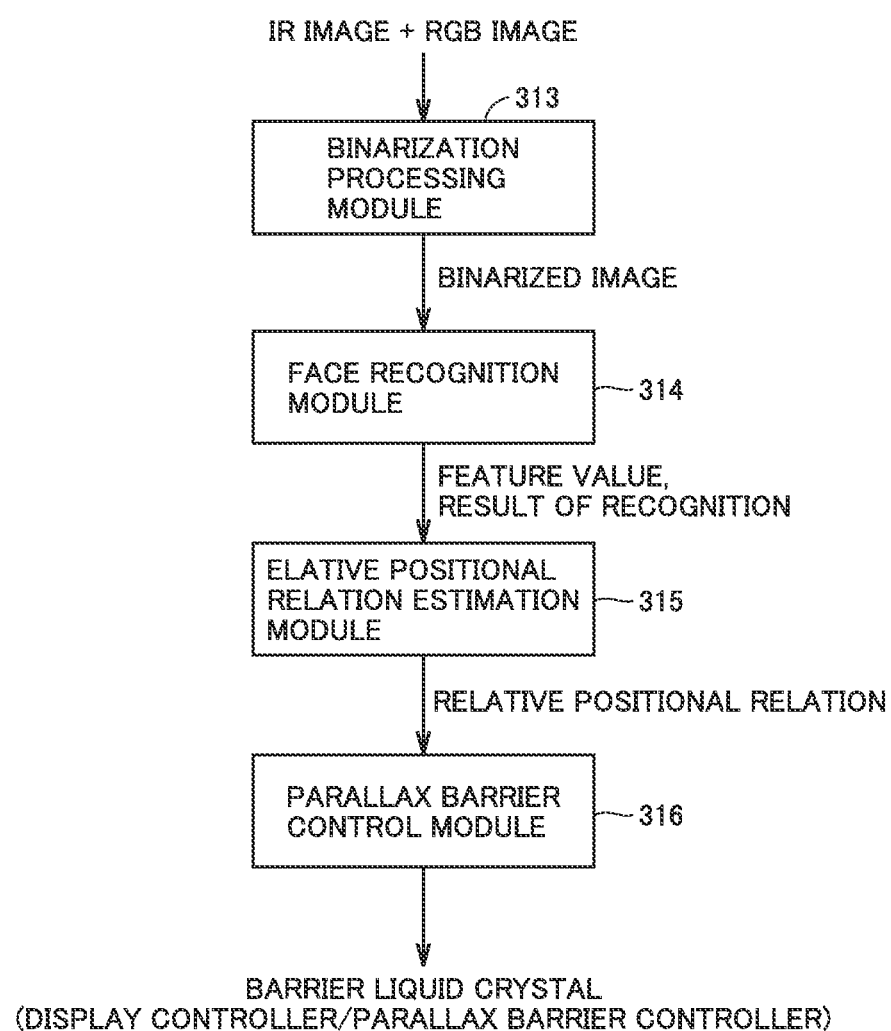

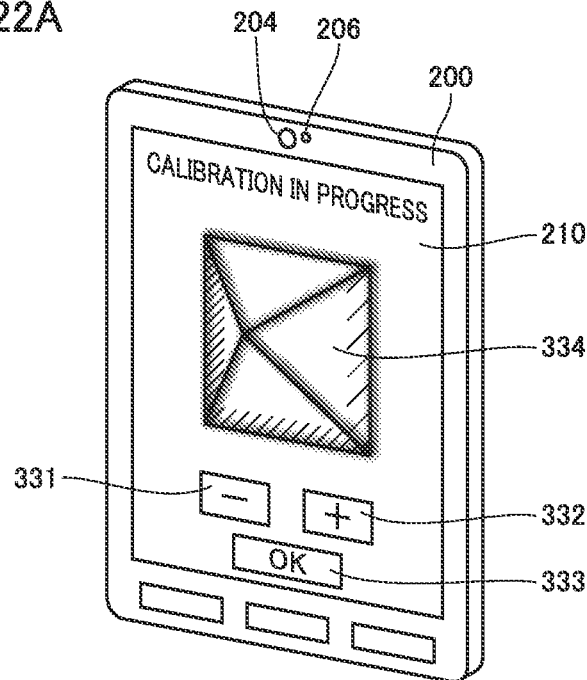
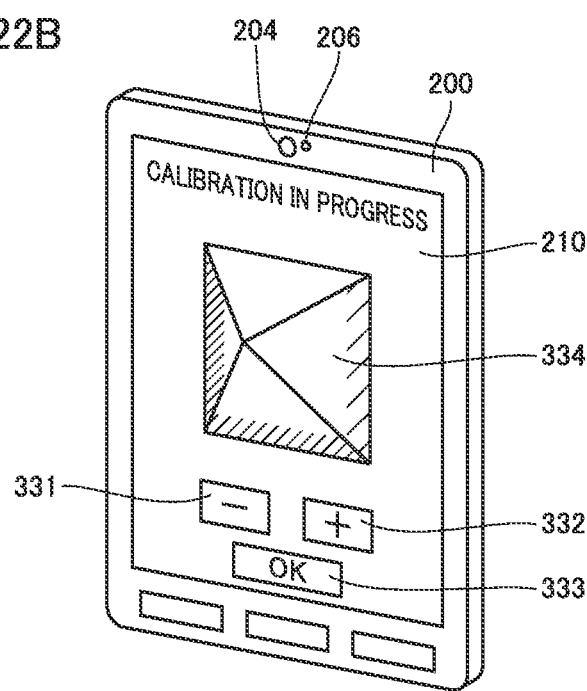

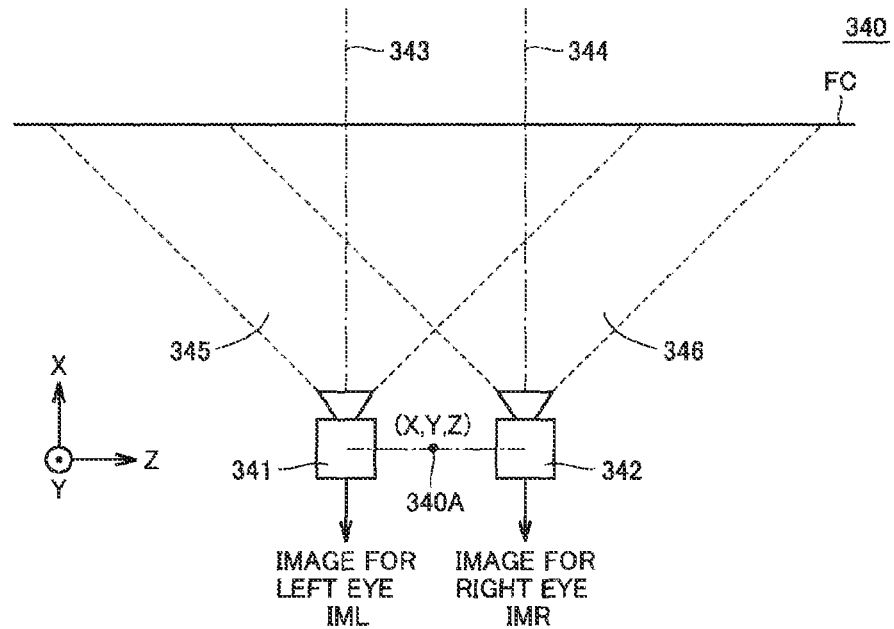
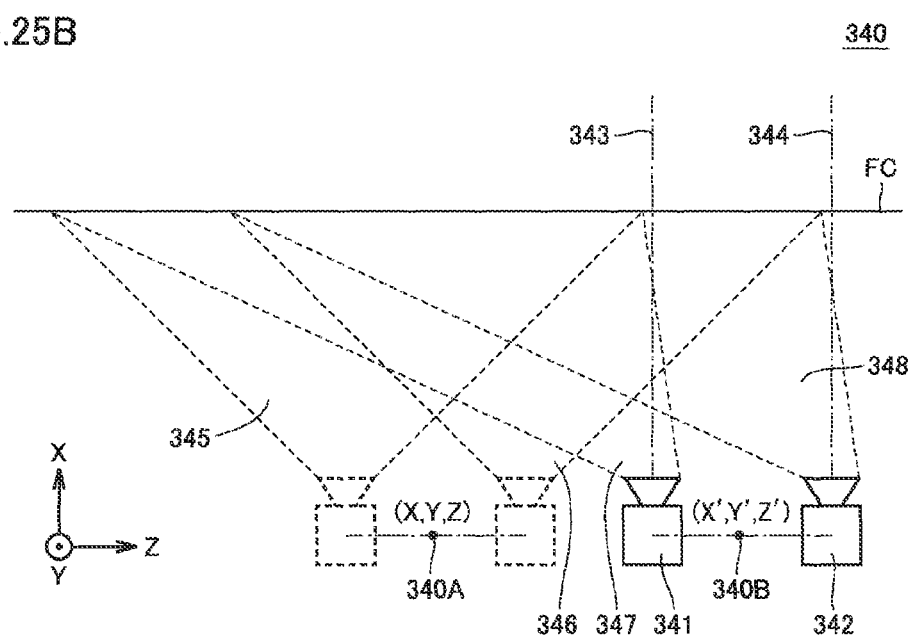

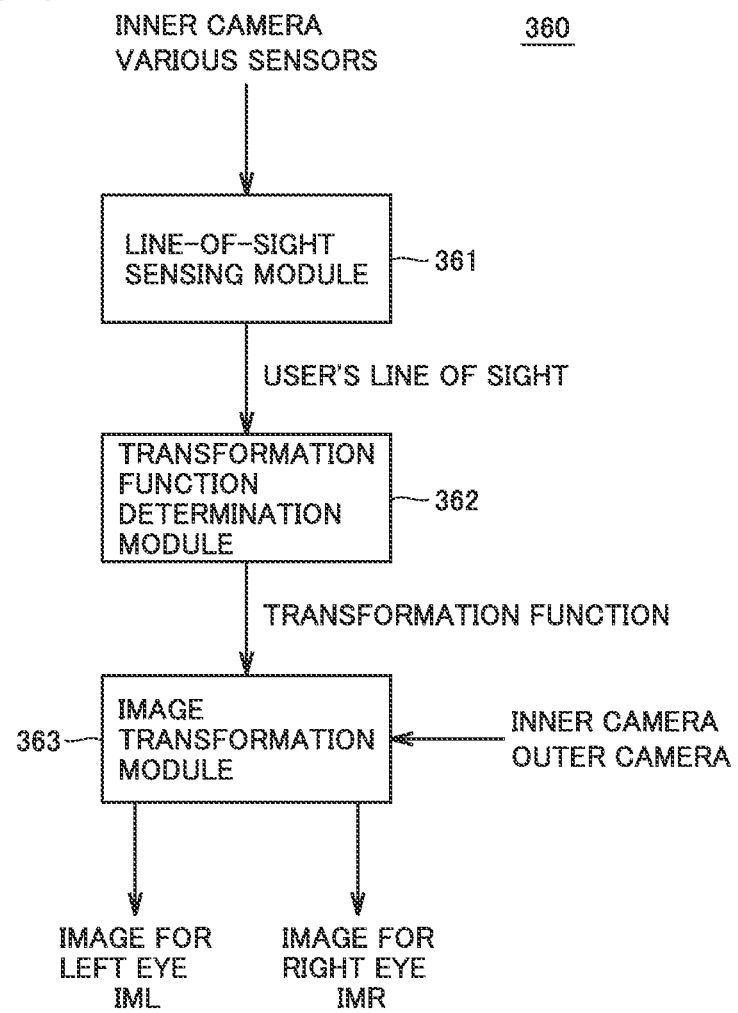

INFORMATION PROCESSING TERMINAL, NON-TRANSITORY STORAGE MEDIUM ENCODED WITH COMPUTER READABLE INFORMATION PROCESSING PROGRAM, INFORMATION PROCESSING TERMINAL SYSTEM, AND INFORMATION PROCESSING METHOD

This nonprovisional application is based on Japanese Patent Application No. 2014-174405 filed with the Japan Patent Office on Aug. 28, 2014, the entire contents of which are hereby incorporated by reference.

FIELD

The technology herein relates to an information processing terminal capable of providing display of various images, a non-transitory storage medium encoded with a computer readable information processing program, an information processing terminal system, and an information processing method.

BACKGROUND AND SUMMARY

A portable information processing device excellent in operability and visual recognition performance of a stereoscopic image has been known.

This information processing device is basically premised on the fact that a stereo image is displayed, which can stereoscopically be viewed while a user faces a stereo image display portion. The present embodiment provides display of more diverse images than in a conventional information processing device.

An exemplary embodiment provides a hand-held information processing terminal that includes a display, a camera arranged in proximity to the display and capable of obtaining an image of a user including infrared components, an estimation module that estimates relative positional relation between the display and the user based on the obtained image, a generation module that generates a plurality of display images in accordance with relative positional relation, and a control module that provides stereoscopic display to the user in accordance with a position of the user with the use of the plurality of display images.

According to the present configuration, relative positional relation between the display and the user is estimated based on the image of the user including the infrared components and a plurality of display images are generated in accordance with the estimated relative positional relation. Since stereoscopic display is provided on the display with the use of the generated images, stereoscopic display with a higher sense of reality can be enjoyed even when the user looks into the display without facing the display. In addition, by using the image including the infrared components, even though a background or surroundings of the user is dark, noise can be reduced and accuracy in estimation of relative positional relation can be enhanced.

In the exemplary embodiment, the display may have an adjustable parallax barrier and the control module may provide stereoscopic display to the user in accordance with a position of the user by adjusting at least one of a position, a width, and an interval of the parallax barrier.

According to the present configuration, by freely controlling the parallax barrier, stereoscopic display having a point of view at a position in accordance with relative positional relation between the user and the display can be provided.

In the exemplary embodiment, the generation module may generate a plurality of display images based on image pick-up of an object arranged in a virtual space by a plurality of virtual cameras arranged at positions in accordance with relative positional relation.

According to the present configuration, since the plurality of display images can be generated with any object being arranged in the virtual space, as compared with use of an image in real world, more diverse stereoscopic display can be provided.

In the exemplary embodiment, the generation module may have the plurality of virtual cameras turned in accordance with relative positional relation, with a point of regard in the virtual space being defined as the reference.

According to the present configuration, even when positions of the plurality of virtual cameras change in accordance with relative positional relation, more natural stereoscopic display can continue to be provided.

In the exemplary embodiment, the generation module may have the plurality of virtual cameras moved in accordance with relative positional relation in a direction in parallel to a plane including the point of regard in the virtual space.

According to the present configuration, processing involved with movement of the plurality of virtual cameras can be simplified.

In the exemplary embodiment, the generation module and the control module may both use relative positional relation estimated by the estimation module.

According to the present configuration, since the generation module and the control module commonly use relative positional relation estimated by the estimation module, processing can be simplified.

In the exemplary embodiment, the generation module may generate a plurality of display images depending on progress of a game application.

According to the present configuration, when the user is absorbed in the game, relative positional relation between the user and the display tends to vary. According to the present configuration, however, a point of view in stereoscopic display is corrected in accordance with relative positional relation, and hence the user can enjoy stereoscopic display even during the game.

In the exemplary embodiment, the generation module may generate a plurality of display images depending on progress of an application making use of movement of the information processing terminal.

During execution of the application making use of movement of the information processing terminal, the user frequently inclines the information processing terminal According to the present configuration, however, a point of view in stereoscopic display is corrected in accordance with relative positional relation, and hence the user can enjoy stereoscopic display even during execution of such an application.

In the exemplary embodiment, the information processing terminal may further include an infrared ray emission portion that emits infrared rays when the camera picks up an image of the user.

According to the present configuration, even when a background or surroundings of the user is dark, an image representing the user and including the infrared components can be obtained as the infrared ray emission portion emits infrared rays.

In the exemplary embodiment, the camera may have a band pass filter for obtaining an image in an infrared wavelength region having a band substantially the same as a band of infrared rays emitted by the infrared ray emission portion. According to the present configuration, an object irradiated with infrared rays can accurately be detected.

An exemplary embodiment provides a hand-held information processing terminal that includes a display, an estimation module that estimates relative positional relation between the display and a user, and a generation module that generates a plurality of display images based on image pick-up of an object arranged in a virtual space by a plurality of virtual cameras arranged at positions in accordance with relative positional relation. The generation module has the plurality of virtual cameras turned in accordance with relative positional relation while a distance from a predetermined point of regard in the virtual space is maintained constant, and the distance from the point of regard is different depending on an application to be executed.

According to the present configuration, since turning of the plurality of virtual cameras within the virtual space is corrected in accordance with an application to be executed, the user can enjoy stereoscopic display suited for the application.

An exemplary embodiment provides a hand-held information processing terminal that includes a display, an estimation module that estimates relative positional relation between the display and a user, and a generation module that generates a plurality of display images based on image pick-up of an object arranged in a virtual space by a plurality of virtual cameras arranged at positions in accordance with relative positional relation. The generation module has the plurality of virtual cameras moved in accordance with relative positional relation, and an amount of movement in accordance with relative positional relation of the plurality of virtual cameras is different depending on an application to be executed.

According to the present configuration, since movement of the plurality of virtual cameras in the virtual space is corrected in accordance with an application to be executed, the user can enjoy stereoscopic display suited for the application.

An exemplary embodiment provides a non-transitory storage medium encoded with a computer readable information processing program executed by a computer of a hand-held information processing terminal. The hand-held information processing terminal has a display and a camera arranged in proximity to the display and capable of obtaining an image of a user including infrared components. The information processing program causes the information processing terminal to perform the steps of estimating relative positional relation between the display and the user based on the obtained image, generating a plurality of display images in accordance with relative positional relation, and providing stereoscopic display to the user in accordance with a position of the user with the use of the plurality of display images.

An exemplary embodiment provides an information processing system having at least one hand-held information processing terminal that includes a display, a camera arranged in proximity to the display and capable of obtaining an image of a user including infrared components, an estimation module that estimates relative positional relation between the display and the user based on the obtained image, a generation module that generates a plurality of display images in accordance with relative positional relation, and a control module that provides stereoscopic display to the user in accordance with a position of the user with the use of the plurality of display images.

An exemplary embodiment provides an information processing method performed by a computer of a hand-held information processing terminal having a display and a camera arranged in proximity to the display and capable of obtaining an image of a user including infrared components. The information processing method includes the steps of estimating relative positional relation between the display and the user based on the obtained image, generating a plurality of display images in accordance with relative positional relation, and providing stereoscopic display to the user in accordance with a position of the user with the use of the plurality of display images.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 2A to 2E show exemplary illustrative non-limiting drawings illustrating a front view (an opened state) with a front side of the game device shown in FIG. 1 being centered.

FIGS. 8A, 8B, 9A, and 9B show exemplary illustrative non-limiting drawings each illustrating a state that the user operates a button group arranged in the game device according to the present embodiment.

FIG. 19 shows an exemplary illustrative non-limiting functional block diagram illustrating one example in which the barrier control function according to the present embodiment is implemented.

FIGS. 22A and 22B show exemplary illustrative non-limiting schematic diagrams each illustrating a calibration function according to the present embodiment.

FIGS. 24A, 24B, 25A, and 25B show exemplary illustrative non-limiting schematic diagrams each illustrating a motion parallax function according to the present embodiment.

FIG. 29 shows an exemplary illustrative non-limiting functional block diagram illustrating another example in which the motion parallax function according to the present embodiment is implemented.

DETAILED DESCRIPTION OF NON-LIMITING EXAMPLE EMBODIMENTS

Figure 1:
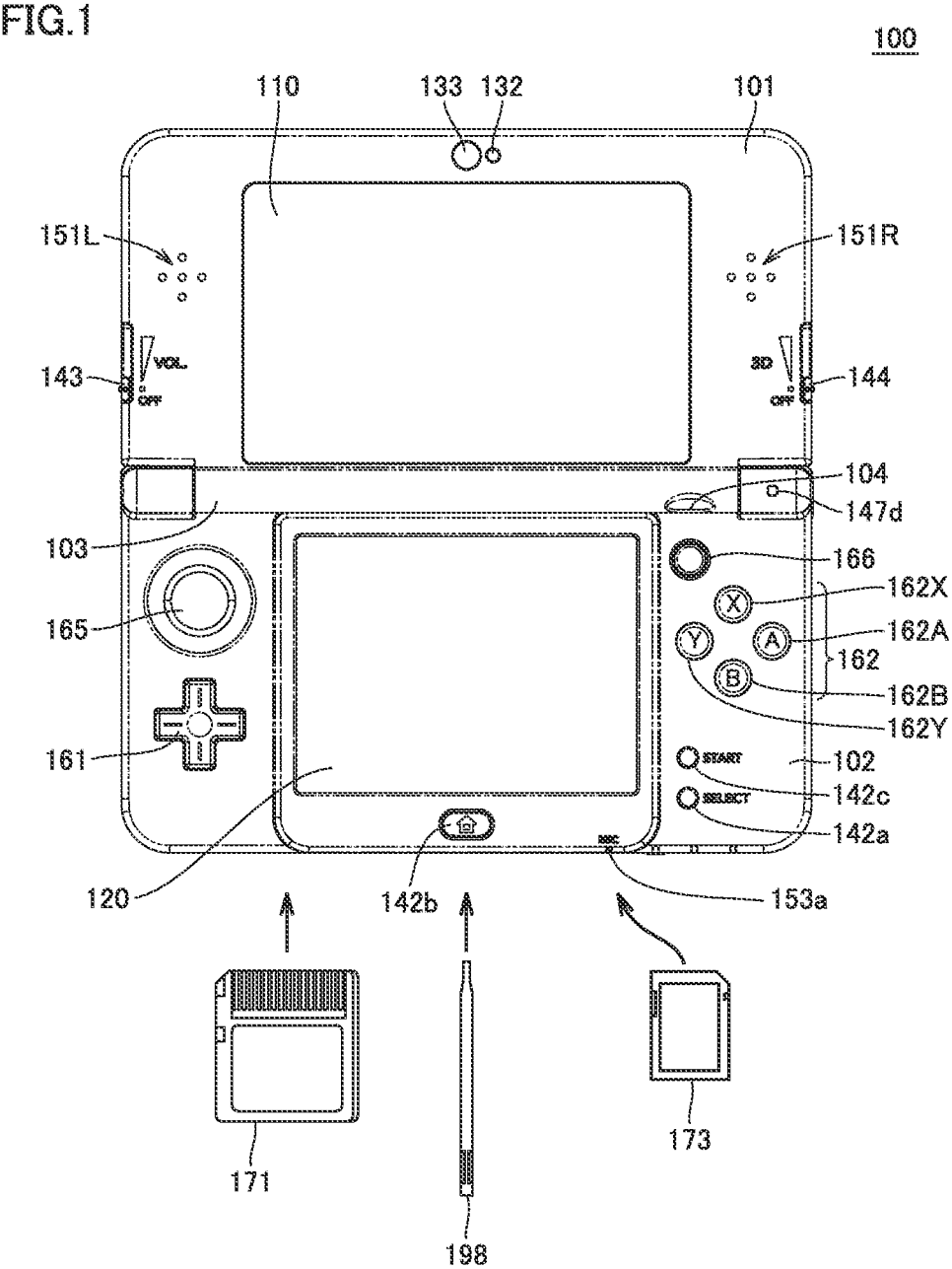
FIG. 1 shows an exemplary illustrative non-limiting drawing illustrating a front view of a game device according to the present embodiment.

The present embodiment will be described in detail with reference to the drawings. The same or corresponding elements in the drawings have the same reference characters allotted and description thereof will not be repeated.

A portable game device 100 and a portable information terminal 200 which are also computers will be described below as representative examples of hand-held information processing terminals. In particular, game device 100 and portable information terminal 200 according to the present embodiment each have a display capable of stereoscopic display as will be described later. The hand-held information processing terminal is not limited to game device 100 and portable information terminal 200, and it can be embodied also as a portable telephone, a smartphone, a tablet, a phablet, or a personal digital assistant/personal data assistance (PDA). Furthermore, as will be described later, it may be embodied as an information processing system including a storage medium storing a program and a main body device to which the storage medium can be attached. Furthermore, it may be embodied as an information processing system in which a display and a camera arranged in proximity to the display and capable of obtaining an image of a user including infrared components and a processing entity performing various types of processing are separate from each other.

A part of processing which will be described later may be performed by another device (typically, a server device connected through a network). In such a form of embodiment, for example, an information processing terminal may perform only processing for accepting an operation from a user or display processing and the server device may perform almost the entire substantial processing.

The term information processing terminal herein may encompass a controller (an operation device) for providing various operations to a main information processing device. In incorporation as a controller, a display may or may not be mounted. When a display is not mounted, a function relating to a display capable of stereoscopic display can be implemented by an externally connected display.

A. Terms

In the present specification, "stereoscopic display", "three-dimensional display", and "3D display" mean that an image is expressed such that a user can visually recognize at least a partial object included in the image stereoscopically. In order to have the user visually recognize the object stereoscopically, typically, physiological functions of eyes and brain of a human are utilized. Such stereoscopic display is realized by using images displayed such that an object is stereoscopically visually recognized by the user (typically, a stereo image having parallax).

In the present specification, "planar display", "two-dimensional display", and "2D display" are terms as opposed to "stereoscopic display" and the like described above, and they mean that an image is expressed such that the user cannot visually recognize an object included in the image stereoscopically.

B. Overview

A hand-held information processing terminal according to the present embodiment estimates relative positional relation between a display and a user and generates a plurality of display images in accordance with the estimated relative positional relation. Furthermore, the information processing terminal provides multiple-viewpoint stereoscopic display on the display with the use of the plurality of generated display images. More specifically, the information processing terminal modifies a displayed image (contents) in accordance with the relative positional relation between the display and the user and performs processing such that the user can enjoy stereoscopic display even though the user does not face the display. By adopting such processing, stereoscopic display with more sense of reality is provided.

C. Game Device 100

<c1: Overall Configuration of Game Device 100>

Figure 3:
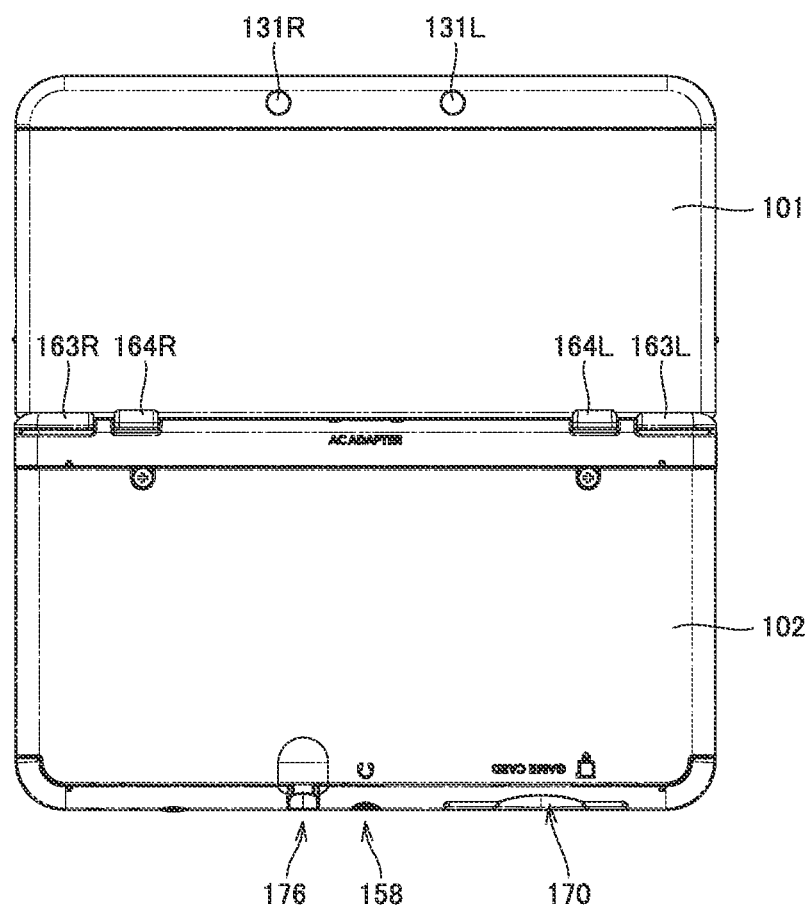
FIG. 3 shows an exemplary illustrative non-limiting drawing illustrating a rear view (the opened state) of the game device shown in FIG. 1.

An overall configuration of a game device 100 according to the present embodiment will initially be described. FIG. 1 shows a front view (an opened state) of game device 100 according to the present embodiment. FIG. 2A shows a front view (the opened state) of game device 100, FIG. 2B shows a lower side view of game device 100, FIG. 2C shows an upper side view of game device 100, FIG. 2D shows a left side view of game device 100, and FIG. 2E shows a right side view of game device 100. FIG. 3 shows a rear view (the opened state) of game device 100 shown in FIG. 1.

In the present specification, with arrangement of game device 100 as shown in FIG. 1 being defined as the reference, that is, with a state that a user uses game device 100 by holding the game device being defined as the reference, the terms a "front surface", a "lower side surface," an "upper side surface," a "left side surface," a "right side surface," and a "rear surface" are used, however, these terms are for the sake of convenience of description and they do not intend to restrict a form of use of game device 100 by the user.

Game device 100 is configured to be foldable by way of example. Game device 100 is preferably designed to have such a size that the user can hold the game device with both hands or one hand in each of an opened state and a closed state. More specifically, game device 100 has an upper housing 101 and a lower housing 102 coupled to be foldable (allow opening and closing). Upper housing 101 and lower housing 102 are each formed like a rectangular plate, and they are coupled to each other to be pivotable around a long side portion thereof by means of a hinge 103.

In game device 100, an angle between upper housing 101 and lower housing 102 can also be held at any angle between a position in the closed state and a position in the opened state (approximately 0° to approximately 180°). In other words, upper housing 101 can rest at any angle with respect to lower housing 102. For resting of the housings, friction force or the like produced in a coupling portion between upper housing 101 and lower housing 102 is used. In addition to or instead of friction force, a latch mechanism may be adopted in the coupling portion between upper housing 101 and lower housing 102.

Game device 100 realizes processing as will be described below by executing a program. A program executed in game device 100 is provided to game device 100 with such a method as (1) being stored in advance, (2) being provided through a game card, (3) being provided through a memory card, or (4) being provided through a network.

A game card 171 and/or a memory card 173 can be attached to game device 100 shown in FIG. 1.

Game card 171 is attached to a game card slot 170 (FIG. 3) provided in the lower side surface of lower housing 102. An interface for electrically connecting game device 100 and game card 171 to each other is arranged in game card slot 170. Game card slot 170 is configured to allow attachment and removal of game card 171. Game card 171 holds an application program or a game program (each including an instruction set).

Memory card 173 is attached to a memory card slot provided in the rear surface side of lower housing 102. The memory card slot is provided in the inside exposed by removing a cover forming a part of a rear surface of lower housing 102 (details of which are not illustrated here). An interface for electrically connecting game device 100 and memory card 173 to each other is arranged in the memory card slot. The memory card slot is configured to allow attachment and removal of memory card 173. Memory card 173 holds, in addition to an application program or a game program (each including an instruction set), a program or an input image obtained from another information processing terminal or a game device as well as an image picked up by game device 100 and/or an image resulting from image processing. Game card 171 is implemented, for example, by such a non-volatile storage medium as a secure digital (SD) card.

Game device 100 can also be regarded as an information processing system constituted of lower housing 102 corresponding at least to a main body portion and game card 171 and/or memory card 173 corresponding to a storage portion storing a program, which is attached to the main body portion.

In upper housing 101, an upper display module 110 is arranged in a central portion on an inner main surface of upper housing 101 as a display (display function) capable of stereoscopic display. Upper display module 110 has a rectangular display region and it is arranged such that a direction in which its long side extends coincides with a direction in which a long side of upper housing 101 extends.

In lower housing 102, a lower display module 120 is arranged in a central portion on an inner main surface of lower housing 102 as a display (display function). Lower display module 120 has a rectangular display region and it is arranged such that a direction in which its long side extends coincides with a direction in which a long side of lower housing 102 extends. Though a display capable of providing stereoscopic display may be adopted as lower display module 120 similarly to upper display module 110, in game device 100, a common display for providing two-dimensional display of various types of information is adopted.

In game device 100, upper display module 110 greater in screen size than lower display module 120 is adopted such that a user can further enjoy stereoscopic display. A screen size, however, does not necessarily have to be different as such, and a screen size is designed as appropriate in accordance with an application or a size of game device 100. Resolution of the display is also designed as appropriate depending on an application or cost.

Typically, a liquid crystal display (LCD) or a display utilizing electro luminescence (EL) can be adopted for upper display module 110 and lower display module 120. Other types of displays put into practical use after filing of the present application can also be adopted as appropriate. Further details of upper display module 110 and lower display module 120 will be described later.

An image pick-up device (image pick-up function) for picking up an image of a subject is arranged in upper housing 101. More specifically, outer cameras 131L and 131R (see FIG. 3) and an inner camera 133 (see FIGS. 1 and 2A) are arranged in upper housing 101. An infrared ray emission module 132 is arranged adjacent to inner camera 133 in upper housing 101. Infrared ray emission module 132 is typically mounted as an infrared light emitting diode (LED).

Inner camera 133 and infrared ray emission module 132 are arranged above upper display module 110, while outer cameras 131L and 131R are arranged in a surface opposite to the inner main surface where inner camera 133 is arranged, that is, in an outer main surface of upper housing 101 (corresponding to a surface on the outside when game device 100 is in the closed state).

Based on such arrangement, outer cameras 131L and 131R can pick up an image of a subject present in a direction in which the outer main surface of upper housing 101 faces, while inner camera 133 can pick up an image of a subject present in a direction opposite to the direction of image pick-up by outer cameras 131L and 131R, that is, in a direction in which the inner main surface of upper housing 101 faces. Infrared ray emission module 132 emits infrared rays to a subject present in a direction in which the inner main surface of upper housing 101 faces and inner camera 133 receives rays reflected from the subject. Infrared ray emission module 132 emits infrared rays when inner camera 133 picks up an image of a user. Inner camera 133 not only picks up an image of a subject in a visible wavelength region, it can pick up an image also in an infrared wavelength region. Thus, inner camera 133 is arranged in proximity to upper display module 110 and it corresponds to a camera capable of obtaining an image of a user including infrared components.

For inner camera 133, a feature provided with a band pass filter in accordance with a wavelength of infrared rays emitted from infrared ray emission module 132 is preferably adopted, in association with a general image pick-up element for image pick-up in the infrared wavelength region. A band pass filter allowing passage of a wavelength range of infrared rays emitted from infrared ray emission module 132 can be employed as this band pass filter. Infrared ray emission module 132 is preferably configured to emit infrared rays in a band close to a band of the infrared wavelength region of which passage is allowed by the band pass filter. Namely, inner camera 133 preferably incorporates a band pass filter for obtaining an image in the infrared wavelength region having a band substantially the same as the band of infrared rays emitted by infrared ray emission module 132. By adopting such a configuration, instead of obtaining an image of the entire general infrared wavelength region, only an image in a band adapted to the band of infrared rays emitted by infrared ray emission module 132 can be obtained. Thus, an object irradiated with infrared rays can accurately be detected. In addition, noise caused by infrared rays emitted from an element other than infrared ray emission module 132 can be reduced.

As another mount example, an image pick-up element having an RGB+IR Bayer structure can also be employed for inner camera 133.

Outer cameras 131L and 131R are arranged at a prescribed distance from each other, and stereoscopic display of a subject can also be provided by using a pair of input images obtained by these outer cameras 131L and 131R. Namely, since a prescribed parallax in accordance with relative positional relation between outer camera 131L and outer camera 131R is present between the pair of input images obtained through image pick-up by outer cameras 131L and 131R, outer cameras 131L and 131R can function as what is called a stereo camera.

An input image obtained through image pick-up by inner camera 133 is basically used for two-dimensional display (non-stereoscopic display). Therefore, when outer cameras 131L and 131R are activated in game device 100, a pair of input images providing stereoscopic display can be obtained, and when inner camera 133 is activated, an input image providing two-dimensional display (non-stereoscopic display) can be obtained.

In upper housing 101, a stereoscopic vision volume 144 (FIGS. 1, 2A, and 2E) is further arranged on the right of upper display module 110. Stereoscopic vision volume 144 is used for adjusting a degree of stereoscopic display (an amount of parallax) in upper display module 110. When viewed from a user, a degree of pop-up from a screen/a degree of recess into the screen, of a visually recognized object is varied based on adjustment of an amount of parallax.

In upper housing 101, a sound volume 143 (FIGS. 1, 2A, and 2E) is further arranged on the left of upper display module 110. Sound volume 143 is used for adjusting a volume of sound output from game device 100.

A speaker (a speaker 151 shown in FIG. 4) serving as an audio generation device (audio generation function) is accommodated in upper housing 101. More specifically, sound emission holes 151L and 151R are arranged on respective left and right sides of upper display module 110. Voice and sound generated from speaker 151 is emitted toward the user through sound emission holes 151L and 151R communicating with speaker 151.

A microphone (a microphone 153 shown in FIG. 4) serving as an audio obtaining device (audio obtaining function) is accommodated in lower housing 102. On an end portion of the main surface and the lower side surface of lower housing 102, a sound collection hole 153a (FIGS. 1, 2A, and 2B) for microphone 153 to collect sound around game device 100 is arranged. A position where microphone 153 is accommodated and a position of sound collection hole 153a communicating with microphone 153 are not limited as such and can arbitrarily be designed.

In game device 100, an input device (input function) accepting an operation by a user is mainly arranged in lower housing 102. More specifically, in lower housing 102, button groups 142, 162, 163, and 164, a direction key 161, a control pad 165, and a pointing stick 166 are arranged as input devices.

Button group 142 includes a select button 142a, a HOME button 142b, a start button 142c, and a power button 142d. Select button 142a and start button 142c are arranged as being aligned in a vertical direction on the right of lower display module 120. HOME button 142b is arranged in the central portion under lower display module 120. Power button 142d is arranged in the central portion in the lower side surface of lower housing 102.

Select button 142a is typically used for selecting an application to be executed in game device 100. HOME button 142b is typically used for calling a menu application from among various applications to be executed in game device 100. Start button 142c is typically used for starting execution of an application in game device 100. Power button 142*d* is used for turning on/off power of game device 100.

Direction key 161 corresponds to a direction input portion, is arranged on the left of lower display module 120, and is an input device allowing an independent operation in two directions. As a user performs a button operation in each direction, a value indicating an operation state is output from direction key 161.

Button group 162 is arranged on the right of lower display module 120 and includes four operation buttons 162A, 162B, 162X, and 162Y brought in correspondence with upward, downward, left, and right directions, respectively. Button group 162 also corresponds to an input portion allowing an independent operation in two directions, and as the user operates operation buttons 162A, 162B, 162X, and 162Y arranged in correspondence with respective directions, a value indicating an operation state is output.

A command output from direction key 161 and/or button group 162 may be used for adjustment of stereoscopic display in game device 100, or used for such an operation as select, enter, and cancel involved with progress of a game in various applications executed in game device 100.

Control pad 165 corresponds to the direction input portion, is arranged on the left of lower display module 120, and represents one example of analog input devices capable of simultaneously accepting input of at least 2 degrees of freedom. More specifically, control pad 165 has a disc-shaped protrusion accepting an operation by a user, and is structured to be able to change positional relation of the protrusion relative to lower housing 102 at least in vertical and lateral directions. For example, control pad 165 outputs an amount of displacement (a vector volume) from a reference position of the protrusion as a result of sensing thereof. Control pad 165 senses movement of a portion onto which an input operation by a user is performed relative to a prescribed reference, and senses a direction of the input operation by the user based on the sensed movement. Thus, control pad 165 senses a direction in accordance with an input operation by the user.

Instead of control pad 165, an analog stick or a joy stick may be adopted. Alternatively, a pointing stick may be adopted as control pad 165.

Pointing stick 166 is arranged on the right of lower display module 120 and represents one example of a pressure-sensitive analog input device capable of simultaneously accepting inputs of at least 2 degrees of freedom. Pointing stick 166 is arranged in the vicinity of button group 162. More specifically, pointing stick 166 has a bar-shaped protrusion accepting an operation by the user and outputs an amount of displacement (a vector volume) of the protrusion which has received an operation by the user as a result of sensing thereof. As will be described later, pointing stick 166 senses strain in accordance with an input operation by the user and senses a direction of the input operation by the user based on sensed strain. Thus, pointing stick 166 senses a direction in accordance with an input operation by the user.

A recess 104 is formed in a portion of hinge 103 in proximity to pointing stick 166. Recess 104 serves to prevent a thumb of a user from interfering with hinge 103 when the user operates pointing stick 166 with his/her thumb.

Button group 163 includes an L button 163L and an R button 163R (FIGS. 2C and 3). L button 163L is arranged at a left end portion of the upper side surface of lower housing 102, and R button 163R is arranged at a right end portion of the upper side surface of lower housing 102. L button 163L and R button 163R are used for an operation such as select in various applications executed in game device 100.

In lower housing 102, a size of a hole formed for arranging pointing stick 166 and a size of a hole formed for arranging button group 162 may be the same or different from each other.

Button group 164 includes a ZL button 164L and a ZR button 164R (FIGS. 2C and 3). ZL button 164L is arranged adjacent to L button 163L on an inner side thereof in the upper side surface of lower housing 102, and ZR button 164R is arranged adjacent to R button 163R on an inner side thereof in the upper side surface of lower housing 102. Namely, on the upper side surface of lower housing 102, L button 163L and ZL button 164L are arranged as being juxtaposed along a lateral direction of the sheet surface, and R button 163R and ZR button 164R are arranged as being juxtaposed along the lateral direction of the sheet surface.

Button group 162, direction key 161, control pad 165, and pointing stick 166 are arranged on the inner main surface of lower housing 102 which is the inside when upper housing 101 and lower housing 102 are folded (FIG. 2A). On the other hand, button groups 163 and 164 are arranged on the upper side surface (a side surface on the upper side) of lower housing 102 (FIGS. 2C and 3). Namely, when a user holds game device 100 (mainly lower housing 102) with both hands, direction key 161 and control pad 165 are arranged at positions which can readily be reached for operation by the left hand (mainly the thumb of the left hand) of the user, and button group 162 and pointing stick 166 are arranged at positions which can readily be reached for operation by the right hand (mainly the thumb of the right hand) of the user.

Button group 163 (L button 163L and R button 163R) and button group 164 (ZL button 164L and ZR button 164R) are arranged on the upper side surface of lower housing 102 (FIGS. 2C and 3). Namely, when the user holds game device 100 (mainly lower housing 102) with both hands, L button 163L and ZL button 164L are arranged at positions which can readily be reached for operation by the left hand (mainly the forefinger of the left hand) of the user and R button 163R and ZR button 164R are arranged at positions which can readily be reached for operation by the right hand (mainly the forefinger of the right hand) of the user.

Game device 100 is further provided with a touch panel 168 as a pointing device in addition to the input devices (input functions) described above. Touch panel 168 is attached to cover a screen of lower display module 120, senses an input operation by a user (a position indication operation and a pointing operation), and outputs a corresponding two-dimensional coordinate value. Touch panel 168 is arranged between direction key 161 and button group 162 on the main surface of lower housing 102.

Typically, a resistive touch panel can be adopted as touch panel 168. Touch panel 168, however, is not limited to the resistive type and various pressing-type touch panels may also be adopted. Touch panel 168 preferably has resolution (sensing accuracy) as high as that of lower display module 120 (display accuracy). The resolution of touch panel 168, however, does not necessarily have to exactly be equal to the resolution of lower display module 120. Though an input operation onto touch panel 168 is normally performed by the user by using a stylus 198, an input operation may be performed by a user's own finger instead of stylus 198.

In game device 100, a display device for presenting an operation state or the like to the user is provided. More specifically, in lower housing 102, an indicator group 147 consisting of a plurality of light emitting diodes (LEDs) is provided as a display device. Indicator group 147 includes a power supply indicator 147a, a charge indicator 147b, a wireless indicator 147c, and a notification indicator 147d. Power supply indicator 147a, charge indicator 147b, and wireless indicator 147c are arranged as being juxtaposed to one another on the lower side surface of lower housing 102 (FIG. 2B). Notification indicator 147d is arranged on the left of hinge 103 (FIG. 2A).

Power supply indicator 147a is arranged at a position brought in correspondence with power button 142d and gives notification of a power supply state in game device 100. Game device 100 contains a not-shown battery (typically, accommodated in lower housing 102), and it is mainly driven by electric power from this battery. Power supply indicator 147a gives notification of a state of power ON in game device 100 and/or a state of charge of the battery. By way of example, while power of game device 100 is turned ON (in the ON state) and a state of charge of the battery is sufficient, power supply indicator 147a illuminates in green, and while power of game device 100 is turned ON (in the ON state) and a state of charge of the battery is low, it illuminates in red.

Charge indicator 147b gives notification of a state of charge of the battery described above. Typically, when a charge adapter (not shown) or the like is attached to game device 100 and the contained battery is being charged, charge indicator 147b illuminates. The charge adapter is connected to a charge terminal 179 (FIG. 2C) provided in the upper side surface of game device 100.

Wireless indicator 147c gives notification of a state of wireless communication in game device 100. Typically, when wireless communication is active, wireless indicator 147c illuminates.

Notification indicator 147d notifies a user that communication with another game device has been established through near field communication or that there is a notification on various applications through Internet communication. When such a condition is satisfied, notification indicator 147d illuminates.

Game device 100 according to the present embodiment incorporates an infrared communication function and an infrared port 177 (FIG. 2C) is provided on the upper side surface of game device 100. This infrared port 177 projects/receives infrared rays, which are carrier waves for data communication.

An accommodation hole 176 (FIGS. 2B and 3) for stylus 198 is provided in the lower side surface of lower housing 102. Stylus 198 is used for an input operation onto the touch panel as will be described later. Stylus 198 is stored in accommodation hole 176 and it is taken out by the user as necessary.

On the lower side surface of lower housing 102, a connection terminal 158 for connecting a headphone and/or a microphone is provided.

In the upper side surface of lower housing 102, a hook 174 (FIG. 2C) for coupling a strap for suspending game device 100 is provided.

<c2: Electrical Configuration of Game Device 100>

An electrical configuration of game device 100 according to the present embodiment will now be described.

Figure 4:
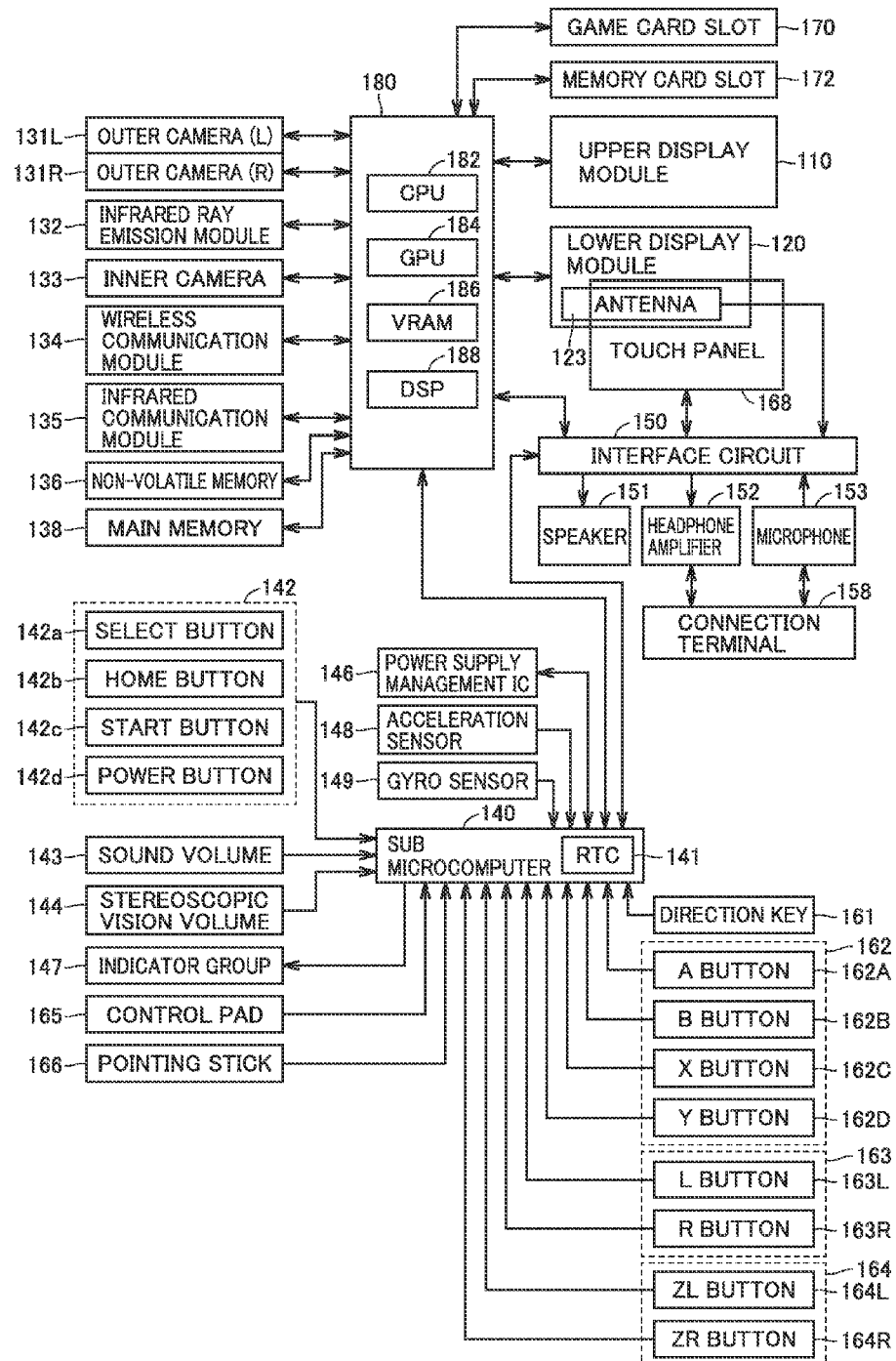
FIG. 4 shows an exemplary illustrative non-limiting block diagram illustrating an electrical configuration of the game device according to the present embodiment.

Referring to FIG. 4, game device 100 includes, as electrical configurations thereof, a main processing unit 180, upper display module 110, lower display module 120, touch panel 168, outer cameras 131L and 131R, infrared ray emission module 132, inner camera 133, a wireless communication module 134, an infrared communication module 135, a non-volatile memory 136, a main memory 138, a sub microcomputer 140, button group 142, sound volume 143, stereoscopic vision volume 144, a power supply management integrated circuit (IC) 146, indicator group 147, an acceleration sensor 148, a gyro sensor 149, an interface circuit 150, speaker 151, a headphone amplifier 152, microphone 153, connection terminal 158, direction key 161, button groups 162, 163, and 164, control pad 165, pointing stick 166, game card slot 170, and a memory card slot 172. Game device 100 includes a battery and a power supply circuit that are not shown.

Main processing unit 180 is responsible for overall control of game device 100. More specifically, main processing unit 180 realizes various types of processing by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like. Namely, main processing unit 180 performs prescribed information processing (for example, game processing) in response to an operation by the user of at least any of direction key 161 and pointing stick 166.

Though a program (an instruction set) executed by main processing unit 180 is typically provided through game card 171 or memory card 173, in addition thereto or instead thereof, a program may be provided to game device 100 through an optical storage medium such as a compact disk read only memory (CD-ROM) or a digital versatile disk (DVD). Moreover, a program may be provided from a server device (not shown) connected through a network.

Main processing unit 180 includes a central processing unit (CPU) 182, a graphical processing unit (GPU) 184, a video random access memory (VRAM) 186, and a digital signal processor (DSP) 188. Processing in each unit will be described later. Main processing unit 180 exchanges data with each unit.

Each of outer cameras 131L and 131R, infrared ray emission module 132, and inner camera 133 is connected to main processing unit 180, and outputs an input image obtained as a result of image pick-up to main processing unit 180 in response to an instruction from main processing unit 180. Each of these cameras includes image pick-up elements such as a charge coupled device (CCD) or a CMOS image sensor (CIS) and a peripheral circuit for reading image data (input image) obtained by the image pick-up elements.

Wireless communication module 134 exchanges data with another game device 100 or some information processing apparatus through a wireless signal. By way of example, wireless communication module 134 communicates data with another device under a wireless LAN scheme complying with such standards as IEEE802.11a/b/g/n.

Infrared communication module 135 establishes wireless communication (infrared communication) with another game device 100. Wireless communication established by this infrared communication module 135 is narrower in coverage than wireless communication through wireless communication module 134. Infrared rays which are carrier waves for this infrared communication are projected/received through infrared port 177 (FIG. 2C).

Non-volatile memory 136 stores firmware (a code or various types of data) or the like necessary for a basic operation of game device 100 and the firmware is developed on main memory 138. As CPU 182 of main processing unit 180 executes a code included in the firmware developed on main memory 138, basic processing in game device 100 is realized. Non-volatile memory 136 may store data on various parameters set in advance in game device 100 (pre-set data). By way of example, non-volatile memory 136 is implemented by a flash memory.

Main memory 138 is used as a work area or a buffer area for main processing unit 180 to perform processing. Namely, main memory 138 temporarily stores a program (a code) or data necessary for processing by main processing unit 180. By way of example, main memory 138 is implemented by a pseudo-SRAM (PSRAM).

Sub microcomputer 140 mainly provides processing involved with a user interface. More specifically, sub microcomputer 140 is connected to main processing unit 180 as well as to button group 142, sound volume 143, stereoscopic vision volume 144, power supply management IC 146, indicator group 147, acceleration sensor 148, gyro sensor 149, direction key 161, button groups 162, 163, and 164, control pad 165, and pointing stick 166. Sub microcomputer 140 senses a button operation or the like by the user, outputs the result of sensing to main processing unit 180, and causes an indicator for notifying the user of various types of information to illuminate, in response to a signal from main processing unit 180.

Sub microcomputer 140 has a real time clock (RTC) 141. Real time clock 141 is a part providing a time-counting function, and counts time in a predetermined cycle. The result of counting is successively output to main processing unit 180. Main processing unit 180 can also calculate the current time (date) or the like based on a count value counted by real time clock 141.

Power supply management IC 146 causes supply of electric power from a power supply (typically, the battery described above) mounted on game device 100 to each unit and controls an amount of supply thereof.

Acceleration sensor 148 senses acceleration generated in game device 100 and the result of sensing is output to main processing unit 180 through sub microcomputer 140. Gyro sensor 149 senses an inclination of game device 100 and the result of sensing is output to main processing unit 180 through sub microcomputer 140. The results of sensing by acceleration sensor 148 and gyro sensor 149 are utilized in a program (a game application) executed on game device 100.

Interface circuit 150 is connected to main processing unit 180 as well as to speaker 151, headphone amplifier 152, microphone 153, and touch panel 168. More specifically, interface circuit 150 includes an audio control circuit (not shown) for controlling speaker 151, headphone amplifier 152 and microphone 153 and a touch panel control circuit (not shown) for controlling touch panel 168.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone. Microphone 153 senses user's voice or the like uttered toward game device 100 to output an audio signal indicating sensed voice to interface circuit 150.

The touch panel control circuit constituting interface circuit 150 generates touch position data indicating a position where the user performed an input operation (a pointing operation) in response to a result of sensing from touch panel 168 and outputs the data to main processing unit 180.

Game card slot 170 and memory card slot 172 are each connected to main processing unit 180. Game card slot 170 reads and writes data from and into attached game card 171 through a connector in response to a command from main processing unit 180. Memory card slot 172 reads and writes data from and into attached memory card 173 through a connector in response to a command from main processing unit 180.

<c3: Pointing Stick 166>

Pointing stick 166 arranged in game device 100 according to the present embodiment will now be described in further detail.

Figure 5:
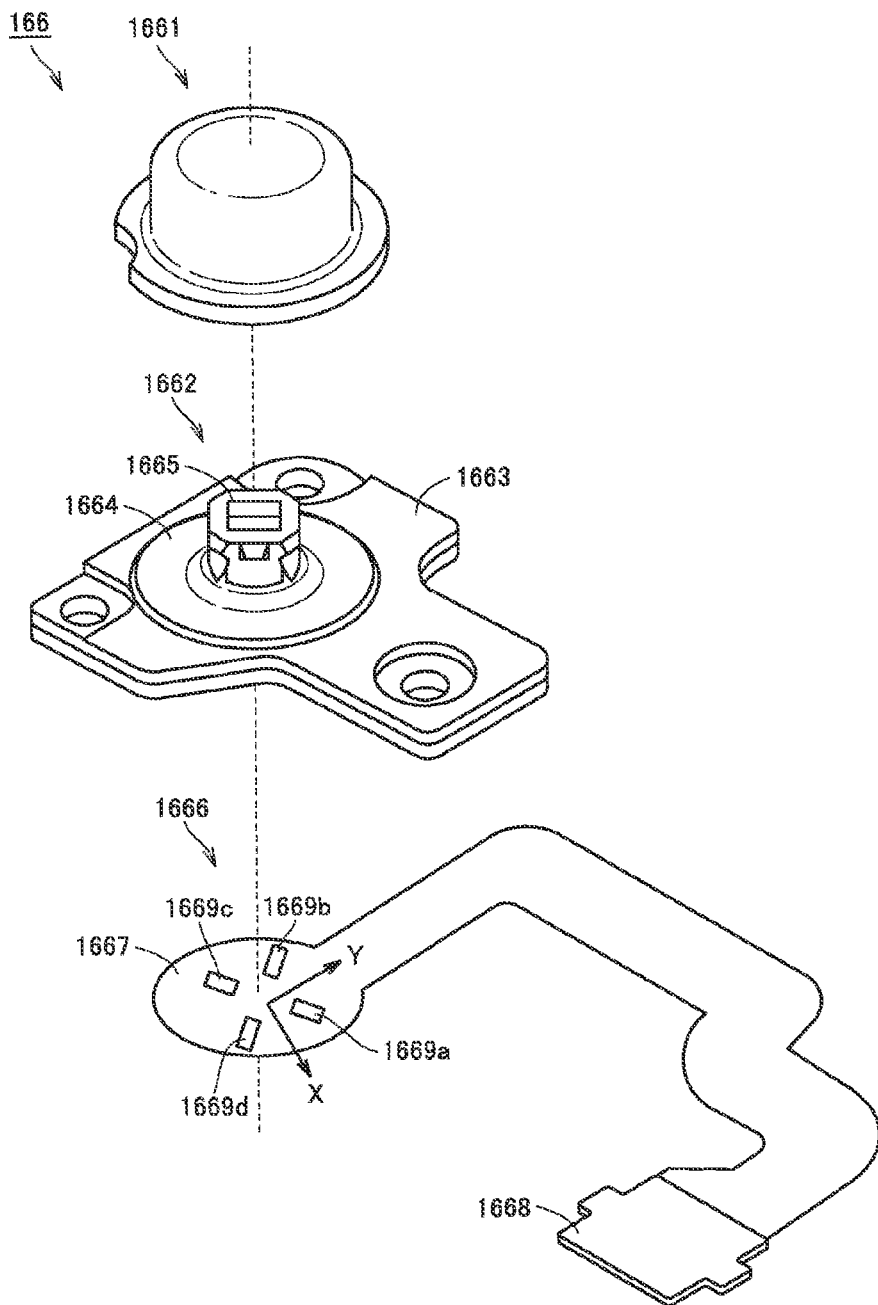
FIG. 5 shows an exemplary illustrative non-limiting exploded perspective view illustrating a pointing stick arranged in the game device according to the present embodiment.

Referring to FIG. 5, pointing stick 166 includes a cap 1661, an operation element 1662, and a sensor substrate 1666.

Cap 1661 is obtained by integrally forming a circumferential surface portion formed in a substantially cylindrical shape, a top surface portion closing an upper side of the circumferential surface portion, and a flange extending outward from an outer circumferential edge of an opening located on a lower end side of the circumferential surface portion. Cap 1661 is preferably formed from an elastic body. Regarding a size of cap 1661 and a size of each button in button group 162, when holes formed in lower housing 102 are equal in size to one another, a size of cap 1661 is preferably made smaller, and when the holes are not equal in size to one another, the size may substantially be the same.

Operation element 1662 is obtained by integrally forming a base portion 1663, a substantially annular seat portion 1664 formed on base portion 1663, and an operation stick 1665 in a quadrangular prism shape formed as being erected on seat portion 1664. Operation element 1662 is formed of a material different from that for button group 162. Operation element 1662 is formed of a resin or a heat-resistant ceramic material, and preferably lower in hardness than button group 162.

Sensor substrate 1666 is formed from a flexible and bendable resin film or the like, and includes at one end thereof, a substantially annular base end portion 1667 fixed to a rear surface of operation element 1662 so as to correspond to a position of seat portion 1664 of operation element 1662. A connector 1668 is provided at the other end of sensor substrate 1666.

A strain sensor 1669 (1669a, 1669b, 1669c, and 1669d) formed from a large-thickness or small-thickness resistive element is arranged in base end portion 1667 of sensor substrate 1666. Base end portion 1667 where strain sensor 1669 is arranged is bonded and fixed to a position on the rear surface of seat portion 1664. By adopting such a configuration, when operation stick 1665 is tilted, compressive force is applied to strain sensor 1669 provided under operation stick 1665 in a direction of tilt and pulling force is applied in a direction opposite to the direction of tilt. These compression force and pulling force will vary each resistance value of strain sensor 1669. By sensing variation in resistance value of such strain sensor 1669, a direction and magnitude of tilt of operation stick 1665 by an operation by the user can be sensed.

Pointing stick 166 is arranged in lower housing 102. The user can operate pointing stick 166 with his/her finger while he/she holds game device 100 (mainly lower housing 102) with both hands and views the display. For example, when the user operates cap 1661 upward, operation stick 1665 is tilted upward and magnitude of tilt upward is sensed in accordance with an amount of variation in resistance value of strain sensor 1669 caused by this tilting. For example, game device 100 has a cursor on a menu screen move upward in correspondence with the sensed input in the upward direction.

How to use a result of sensing in connection with pointing stick 166 can arbitrarily be designed in an application executed in game device 100. A result of sensing in connection with pointing stick 166 may be processed similarly to a result of sensing in connection with direction key 161 or control pad 165 or a special operation may be allocated to pointing stick 166. Since an amount of displacement to be provided by the user to pointing stick 166 can be less than that to control pad 165, the pointing stick is more suited to a quick operation. For example, the pointing stick is suited for such an operation as switching a point of view (that is, control of a position of a virtual camera arranged in a virtual space) in an action game or a drive game or such an operation as making a display range smaller/larger.

Figure 6A:
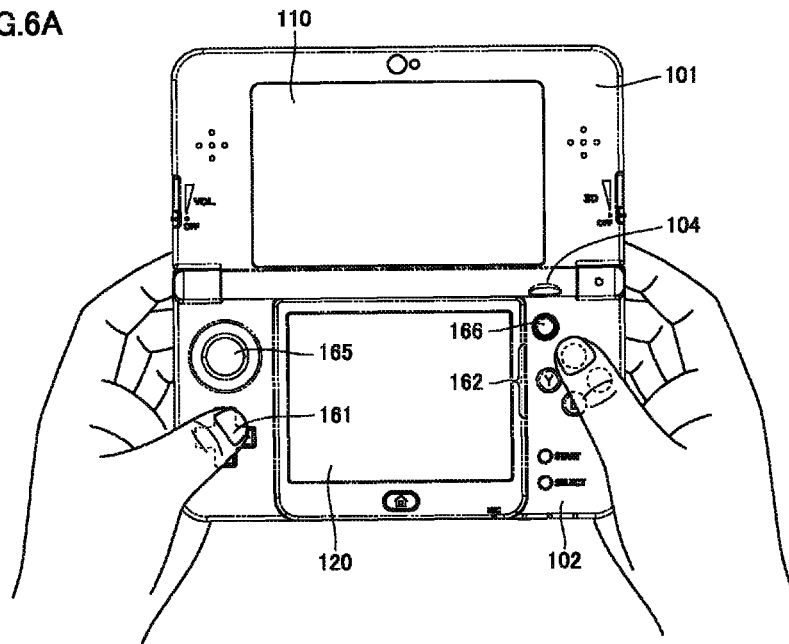
FIGS. 6A, 6B, 7A, and 7B show exemplary illustrative non-limiting drawings each illustrating a state that a user operates the pointing stick arranged in the game device according to the present embodiment.
Figure 6B:
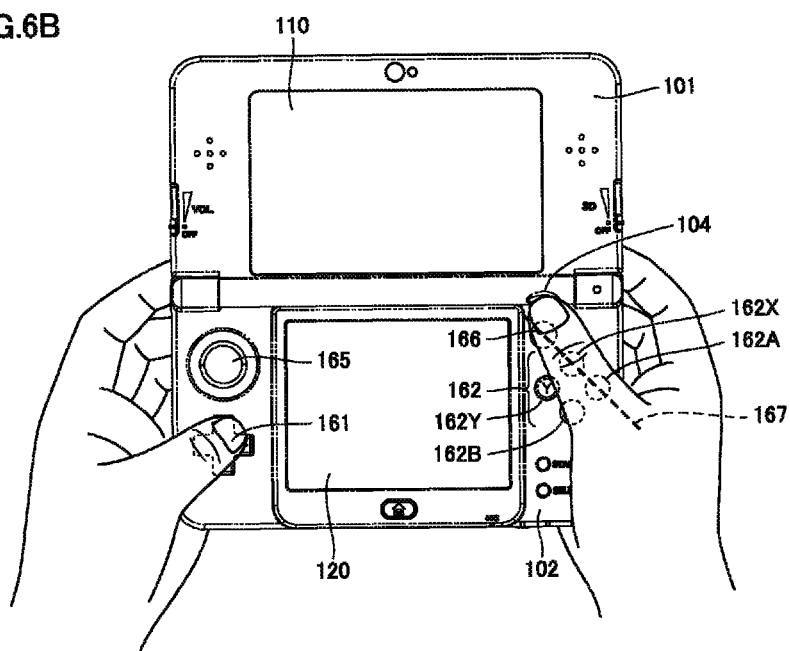

FIGS. 6A and 6B each show a state that the user holds lower housing 102 corresponding to the main body portion with both hands. FIG. 6A shows a state that the user operates operation button 162X and FIG. 6B shows a state that the user operates pointing stick 166.

As shown in FIGS. 6A and 6B, on the main surface of lower housing 102 corresponding to the main body portion, direction key 161 is arranged at a position which can be reached for operation by one hand (left hand) of the user when the user holds game device 100 (lower housing 102) with both hands, and button group 162 (operation buttons 162A, 162B, 162X, and 162Y) corresponding to the operation button is arranged at a position which can be reached for operation by the other hand (right hand) of the user.

Pointing stick 166 corresponding to an analog input portion is arranged on the same side as button group 162 (that is, on the right of lower display module 120) on the main surface of lower housing 102. Control pad 165 corresponding to another analog input portion is arranged on the same side as direction key 161 (that is, on the left of lower display module 120) on the main surface of lower housing 102. By adopting such a layout, higher operability can be provided to the user.

By adopting the layout of the input devices as shown in FIGS. 6A and 6B, the user can perform an operation as he/she intends with both hands while the user watches contents displayed on the display (upper display module 110 and/or lower display module 120).

In particular, by arranging button group 162 (operation buttons 162A, 162B, 162X, and 162Y) representing a digital input portion accepting such a digital operation as whether or not to press a button and pointing stick 166 representing the analog input portion for sensing a direction of operation in proximity to each other, an appropriate operation in accordance with contents or progress of an application can readily be performed. Namely, pointing stick 166 is arranged at a position where a selective operation between pointing stick 166 and button group 162 by the other hand (right hand) of the user can be performed. In the present embodiment, pointing stick 166 is arranged above button group 162 (operation buttons 162A, 162B, 162X, and 162Y) on the main surface of lower housing 102 corresponding to the main body portion.

In order to facilitate such a selective operation, button group 162 and pointing stick 166 are arranged in positional relation suited for movement of a hand of a user. For example, operation buttons 162A, 162B, 162X, and 162Y constituting button group 162 are regularly arranged, and pointing stick 166 is also arranged in accordance with this regular arrangement. Specifically, on the main surface of lower housing 102, operation buttons 162A, 162B, 162X, and 162Y are arranged at positions corresponding to vertices of a square or a rhombus, and pointing stick 166 is arranged on a straight line 167 connecting operation button 162A and operation button 162X to each other or in the vicinity thereof.

In game device 100, a distance between lower display module 120 and pointing stick 166 is shorter than a distance between lower display module 120 and operation button 162Y. Namely, pointing stick 166 is arranged at a position closer to lower display module 120 than operation button 162Y.

From a different point of view, pointing stick 166 is arranged closer to upper housing 101 (an upper side of the sheet surface) than button group 162. In other words, pointing stick 166 is arranged at a position farther than button group 162 (operation buttons 162A, 162B, 162X, and 162Y) when viewed from the user holding game device 100 (lower housing 102) with both hands. With arrangement of pointing stick 166 on the upper side of the sheet surface, recess 104 is provided in hinge 103 such that a user's finger operating pointing stick 166 does not interfere with hinge 103.

From a different point of view, as can be seen based on comparison between FIGS. 6A and 6B, button group 162 and pointing stick 166 are arranged on a line of flow of a finger (thumb) moved by the user. Namely, pointing stick 166 is arranged on an extension of a direction in which the thumb of the right hand of the user moves while the thumb touches button group 162 (operation button 162A or operation button 162X).

Figure 7A:
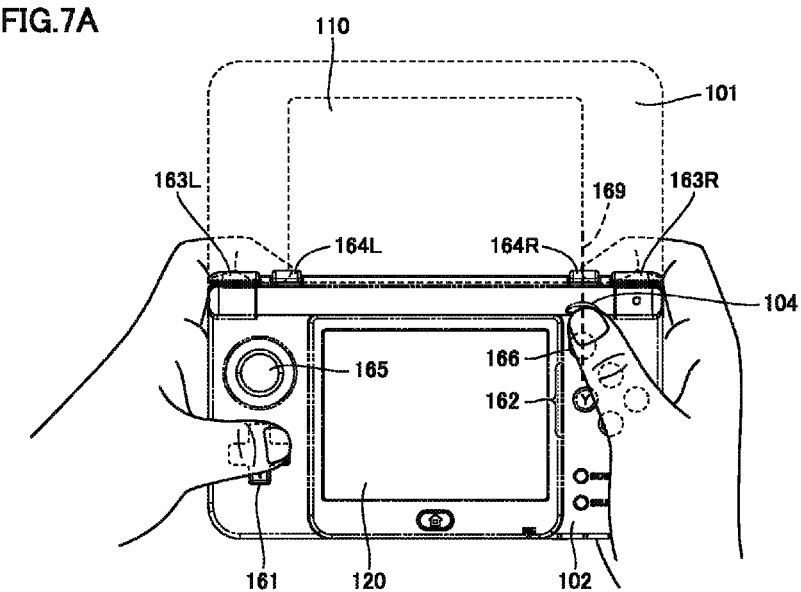
Figure 7B:
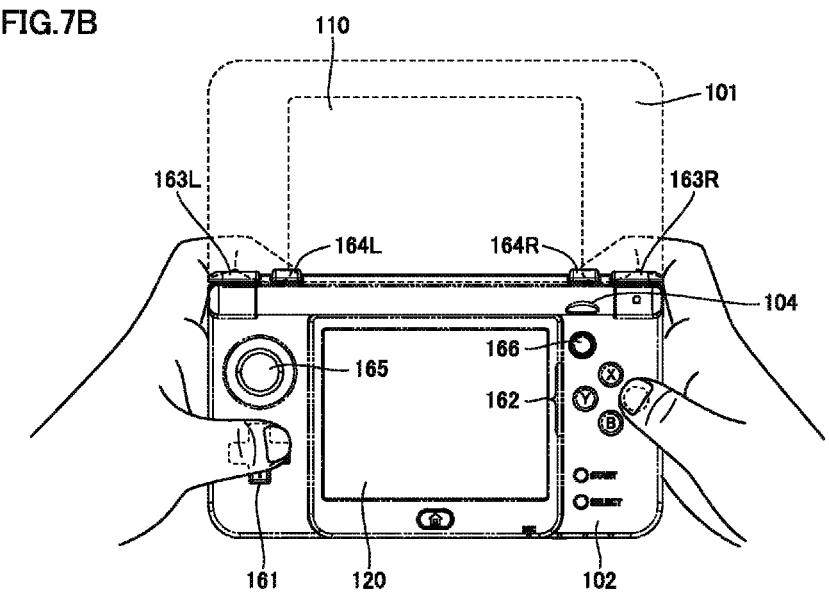

FIGS. 7A and 7B each show upper housing 101 with a dashed line in order to explain a state of a forefinger to a user.

Referring to FIGS. 7A and 7B, ZL button 164L and ZR button 164R are arranged on the upper side surface of lower housing 102. Namely, game device 100 includes operation buttons (ZL button 164L and ZR buttons 164R) arranged on a surface of lower housing 102 farthest from the user when the user holds game device 100 (mainly lower housing 102) with both hands.

FIG. 7A shows a state that the user operates ZL button 164L and ZR button 164R. Namely, the user operates ZL button 164L with his/her left forefinger and operates ZR button 164R with his/her right forefinger. Here, the user can also operate direction key 161 or control pad 165 with his/her left thumb. In addition, the user can operate pointing stick 166 with his/her right thumb.

Namely, the user can concurrently operate direction key 161 or control pad 165 and ZL button 164L, and can concurrently operate pointing stick 166 and ZR button 164R. Thus, pointing stick 166 is arranged at a position where an operation to pointing stick 166 can be performed in parallel with an operation to the operation button (ZR button 164R) by the other hand (the right hand) of the user. Namely, pointing stick 166 is arranged at a position which can be reached for operation by the thumb of the other hand (right hand) when the operation button (ZR button 164R) is operated with the forefinger of the other hand (right hand).

From a different point of view, pointing stick 166 is arranged at substantially the same position as ZR button 164R in the lateral direction of the sheet surface. In other words, pointing stick 166, recess 104, and ZR button 164R are arranged as substantially being aligned on a straight line 169 in parallel to the vertical direction of the sheet surface.

Referring to FIGS. 7A and 7B, on the surface where ZL button 164L and ZR button 164R are arranged, that is, on the upper side surface of lower housing 102, L button 163L and R button 163R representing the operation buttons are arranged on an end side on the upper side surface. The user can arbitrarily operate the input device arranged on the upper side surface of lower housing 102 and the input device arranged on the main surface of lower housing 102 by moving as appropriate the forefinger and the thumb of each hand.

<c4: Button Groups 163 and 164>

Button groups 163 and 164 arranged on the upper side surface of lower housing 102 will now be described.

Figure 8A:
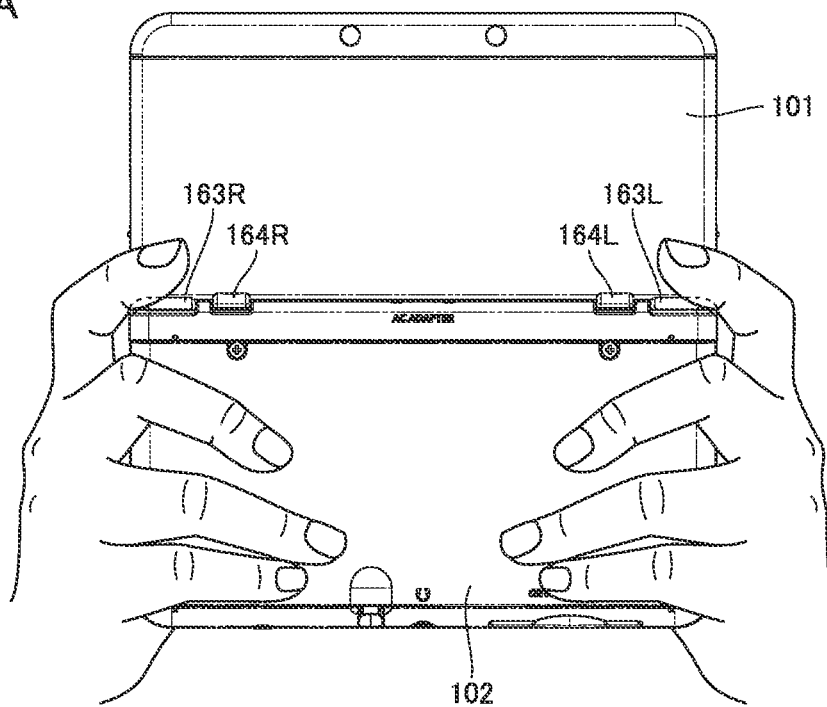
Figure 8B:
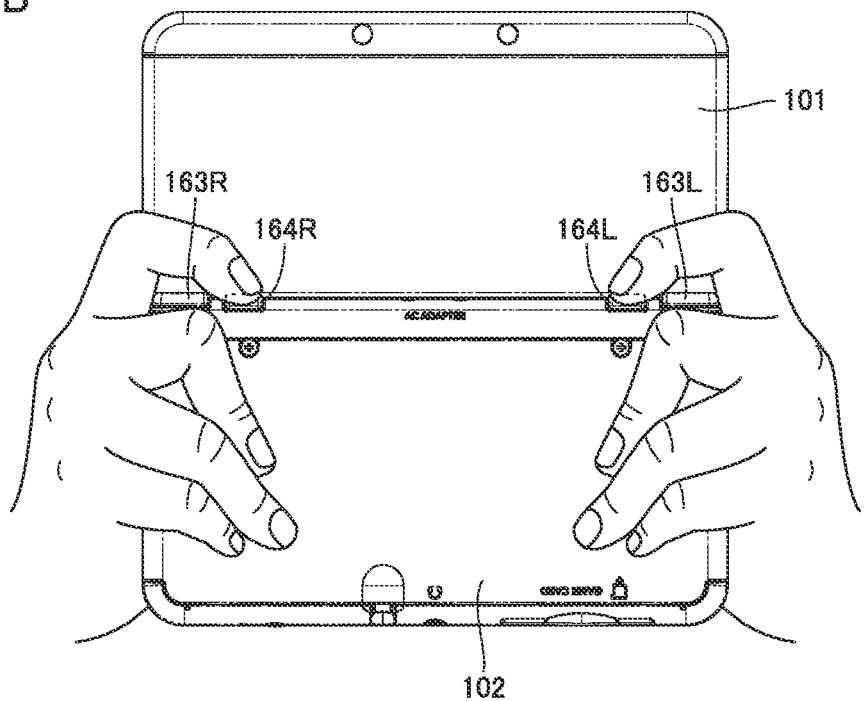

FIGS. 8A and 9A each show a state that the user operates L button 163L and R button 163R, and FIGS. 8B and 9B each show a state that the user operates ZL button 164L and ZR button 164R.

An operation of L button 163L, R button 163R, ZL button 164L, and ZR button 164R is allocated as appropriate in accordance with an application executed in game device 100. Namely, since the user can operate four independent buttons provided on the upper side surface of lower housing 102, a degree of freedom in operability of the user can be enhanced and the user can further enjoy an application such as a game.

On the other hand, in order to lower the possibility of an erroneous operation by the user, some structural devisals have been made. Button groups 163 and 164 will be described below in detail.

As can be seen based on comparison between FIGS. 8A and 8B, when the user operates L button 163L and R button 163R, respective forefingers are located to extend toward the upper side surface along the left side surface and the right side surface of lower housing 102. Namely, the user operates L button 163L and R button 163R while portions around roots of respective forefingers are substantially brought in intimate contact with the left side surface and the right side surface of lower housing 102.

In contrast, when the user operates ZL button 164L and ZR button 164R, respective forefingers are located astride L button 163L and R button 163R. Namely, the user operates ZL button 164L and ZR button 164R while first joints and second joints of respective fingers are further bent.

Alternatively, as shown in FIG. 9B, respective forefingers may also be located to extend from a rear surface side toward the upper side surface of lower housing 102. Namely, the user operates ZL button 164L and ZR button 164R while respective forefingers are substantially brought in intimate contact so as to extend from the left side surface and the right side surface of lower housing 102 toward the upper side surface.

Figure 10A:
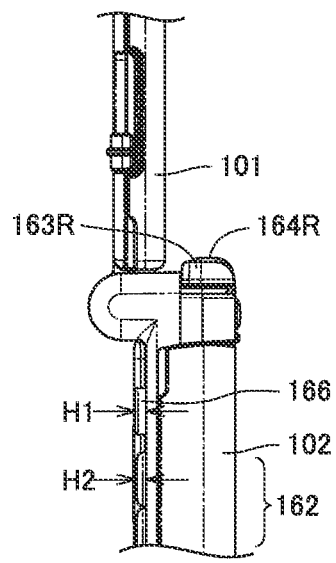
FIGS. 10A and 10B show exemplary illustrative non-limiting drawings each illustrating an enlarged view with an R button and a ZR button being centered.
Figure 10B:
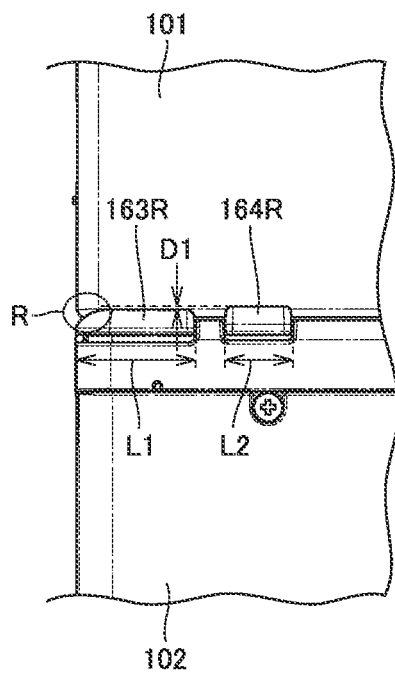

FIG. 10A shows an enlarged view of the right side surface of game device 100 and FIG. 10B shows an enlarged view of the rear surface of game device 100.

Referring to FIGS. 8A, 8B, 9A, 9B, 10A, and 10B, L button 163L and ZL button 164L are different in shape from each other and R button 163R and ZR button 164R are different in shape from each other. More specifically, as shown in FIG. 10B, a width L1 (a length in the lateral direction of the sheet surface) of each of L button 163L and R button 163R is greater than a width L2 of each of ZL button 164L and ZR button 164R. An outer side (an end side) of L button 163L and R button 163R is provided with a curve R. With this curve R, access to L button 163L and R button 163R by a forefinger of a user is facilitated and operability can be improved.

A protruding height of ZL button 164L and ZR button 164R from the upper side surface of lower housing 102 is greater than a protruding height of L button 163L and R button 163R. More specifically, as shown in FIG. 10B, ZR button 164R further protrudes by a distance D1 relative to R button 163R. Namely, a surface of L button 163L and R button 163R where an operation by the user is received and a surface of ZL button 164L and ZR button 164R where an operation is received are different from each other in height from the upper side surface of lower housing 102. This difference in protruding height can lower the possibility of an erroneous operation by the user between L button 163L and ZL button 164L or between R button 163R and ZR button 164R. In addition, the possibility of unintended simultaneous pressing of ZL button 164L and L button 163L or ZR button 164R and R button 163R can also be lowered.

As shown in FIG. 9B, the user may operate ZL button 164L and ZR button 164R with respective forefingers being extended from the rear surface side of lower housing 102. As shown in FIGS. 10A and 10B, the surface of ZL button 164L and ZR button 164R where an operation by the user is received extends not only to the side of the upper side surface of lower housing 102 but also to the rear surface side of lower housing 102. Namely, the user can readily operate ZL button 164L and ZR button 164R also when he/she extends the forefinger from the rear surface side.

Preferably, a height, that is, an amount of projection, from the main surface is differed also between button group 162 and pointing stick 166 in order to lower the possibility of unintended simultaneous pressing. More specifically, as shown in FIG. 10A, a height H1 of pointing stick 166 from the main surface of lower housing 102 is greater than a height H2 of button group 162 from the main surface.

<c5: Configuration Involved with Display of Game Device 100>

A configuration involved with the display of game device 100 according to the present embodiment will now be described.

Figure 11:
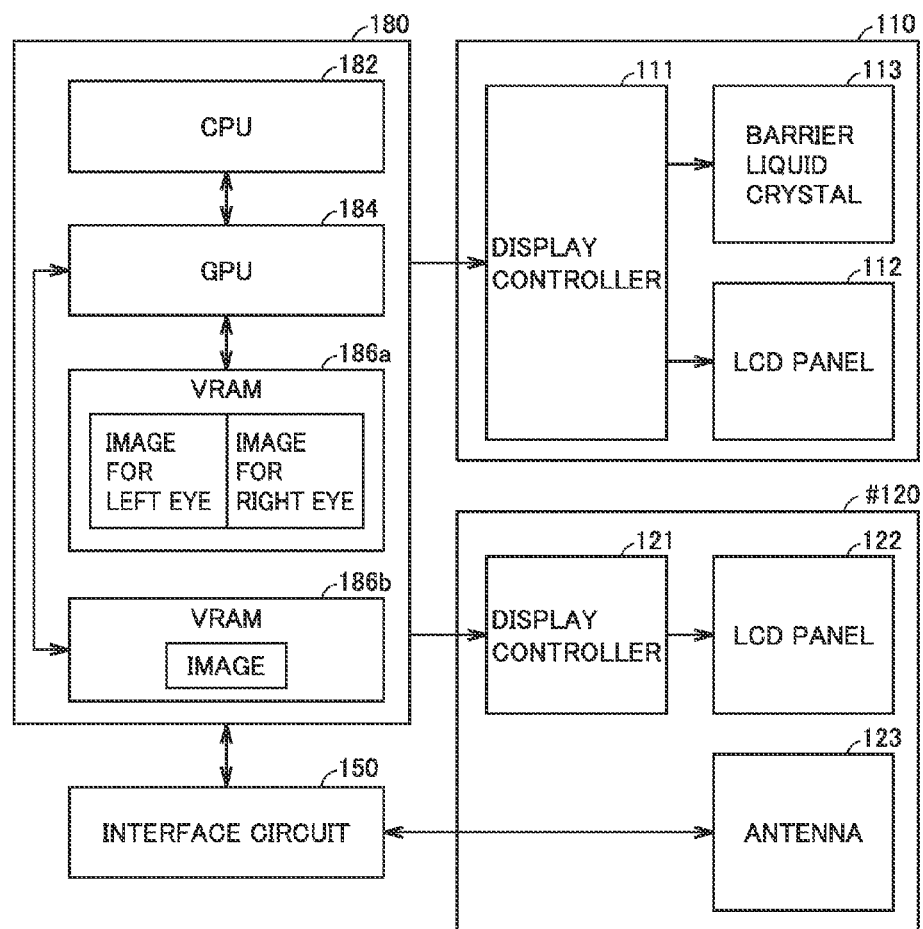
FIG. 11 shows an exemplary illustrative non-limiting block diagram illustrating a configuration involved with a display of the game device according to the present embodiment.

Referring to FIG. 11, main processing unit 180 of game device 100 includes GPU 184 mainly performing processing for displaying an image (image processing) on upper display module 110 and lower display module 120, in addition to CPU 182. GPU 184 has a processing circuit specialized in image processing and successively generates images to be displayed on upper display module 110 and lower display module 120 in response to a command from CPU 182. These images are transferred to a VRAM 186a for upper display module 110 and a VRAM 186b for lower display module 120.

A pair of input images (an image for left eye and an image for right eye) for providing stereoscopic display on upper display module 110 is written in VRAM 186a independently of each other. In contrast, since two-dimensional display (non-stereoscopic display) is provided on lower display module 120, a single image is written in VRAM 186b.

Upper display module 110 includes a display controller 111, an LCD panel 112, and a barrier liquid crystal 113. Barrier liquid crystal 113 is used for adjusting a parallax of a multiple-viewpoint image provided to a user who has viewed upper display module 110. Namely, upper display module 110 is a display capable of stereoscopic display having an adjustable parallax barrier. In the description below, a configuration example including a dual-viewpoint (dual-eye) display will be described as a typical example of a display capable of stereoscopic display. In the dual-viewpoint display, an image for left eye and an image for right eye which are independent of each other are incident on the left eye and the right eye of the user, respectively, and a stereoscopic effect (an amount of pop-up or an amount of recess) can be controlled by adjusting a parallax between the image for left eye and the image for right eye. A configuration of barrier liquid crystal 113 and a method of controlling the same will be described in detail in <e1: Barrier Control Function> which will be described later.

Lower display module 120 includes a display controller 121, an LCD panel 122, and an antenna 123. Antenna 123 is connected to interface circuit 150 and realizes non-contact communication. Non-contact communication using antenna 123 will be described later.

<c6: Stereoscopic Display on Upper Display Module 110 of Game Device 100>

Upper display module 110 providing stereoscopic display in game device 100 will now be described.

Figure 12A:
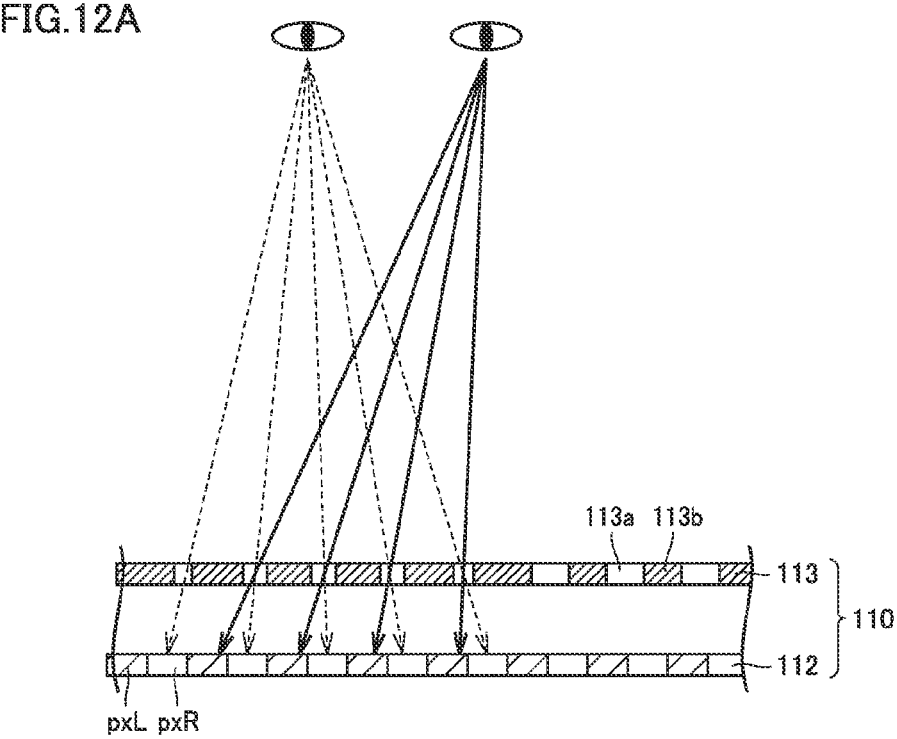
FIGS. 12A and 12B show exemplary illustrative non-limiting schematic cross-sectional views each illustrating an upper display module of the game device according to the present embodiment.
Figure 12B:
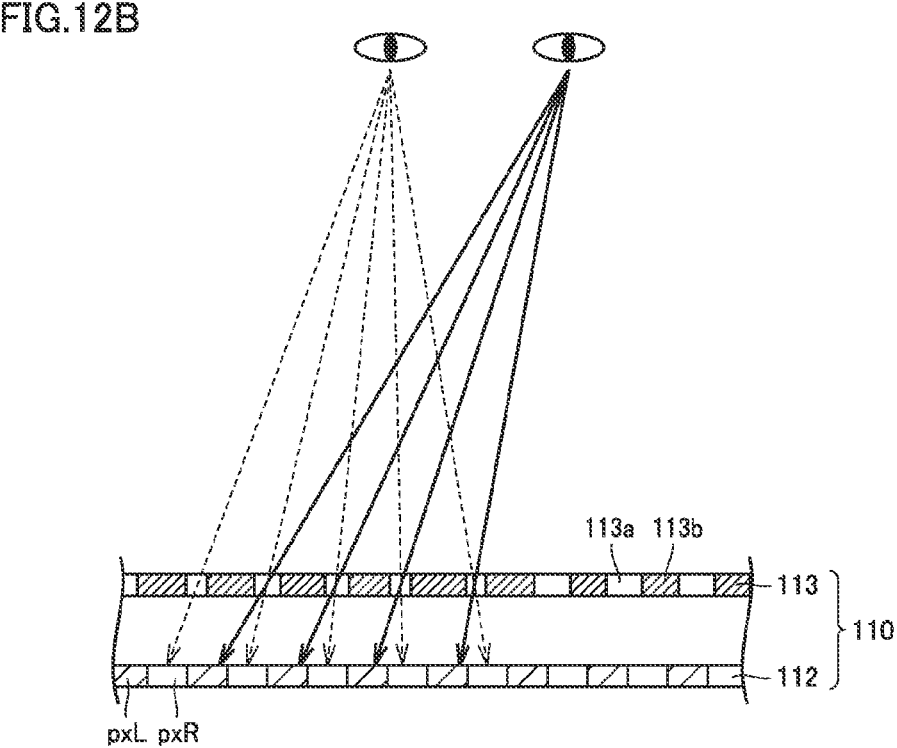

Referring to FIGS. 12A and 12B, upper display module 110 is typically implemented by a parallax barrier type liquid crystal display device. Upper display module 110 includes LCD panel 112 and barrier liquid crystal 113 provided on a front side of LCD panel 112 in game device 100. A not-shown backlight is provided on the rear side of LCD panel 112 in game device 100.

LCD panel 112 includes a group of pixels arranged in matrix. Barrier liquid crystal 113 is a parallax optical system for adjusting an image provided to a user, and a plurality of slits are provided in rows and columns at prescribed intervals. More specifically, in barrier liquid crystal 113, a passage region 113a and a non-passage region 113b are implemented under a prescribed rule. The user views LCD panel 112 through barrier liquid crystal 113. Non-passage region 113b of barrier liquid crystal 113 restricts a region (a pixel) of LCD panel 112 visually recognized by the user. Namely, each slit formed in barrier liquid crystal 113 restricts a field of view of the left eye and the right eye of the user to a corresponding angle.

In a state of barrier liquid crystal 113 shown in FIGS. 12A and 12B, a pixel not blocked by non-passage region 113b on LCD panel 112 (hereinafter also referred to as a left eye visually recognized pixel group pxL) can visually be recognized by the left eye of the user and a pixel not blocked by non-passage region 113b on LCD panel 112 (hereinafter also referred to as a right eye visually recognized pixel group pxR) can visually be recognized by the right eye of the user.

By appropriately adjusting slits in barrier liquid crystal 113 (that is, a layout of passage region 113a and non-passage region 113b), stereoscopic display can be provided to the user even though the user does not face the display. More specifically, display controller 111 (FIG. 11) adjusts at least one of a position, a size (a width), and an interval of the slits in barrier liquid crystal 113 (passage region 113a and non-passage region 113b) in response to a command from main processing unit 180 (FIG. 11).

For example, FIG. 12A shows a state that the user is present on the left of the sheet surface and FIG. 12B shows a state that the user is present on the right of the sheet surface. In any state shown in FIGS. 12A and 12B, only left eye visually recognized pixel group pxL is viewed by the left eye of the user and only right eye visually recognized pixel group pxR is viewed by the right eye of the user. Namely, by adjusting the slits in barrier liquid crystal 113 in accordance with relative positional relation between the display and the user, an image having a predetermined parallax can always be provided to the user.

Figure 13:
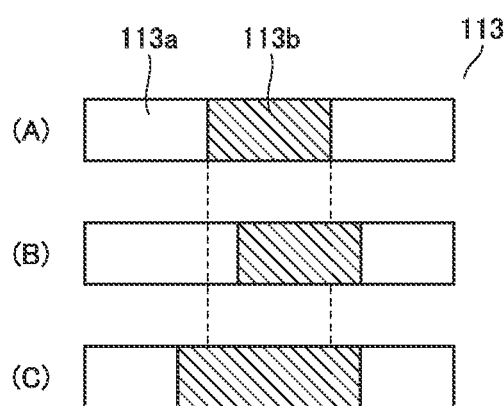
FIG. 13 shows an exemplary illustrative non-limiting drawing illustrating one example of a method of adjusting a slit in a barrier liquid crystal shown in FIGS. 12A and 12B.

With a state of non-passage region 113b shown in (A) in FIG. 13 being defined as the reference, as shown in (B) in FIG. 13, non-passage region 113b may be shifted to the right of the sheet surface (or to the left of the sheet surface), that is, a position of non-passage region 113b may be adjusted. Alternatively, as shown in (C) in FIG. 13, a size (a width) of non-passage region 113b may be adjusted. With adjustment of a position or a size (a width) of non-passage region 113b as shown in (B) in FIG. 13 or (C) in FIG. 13, an interval between slits (an interval between passage region 113a and non-passage region 113b) is modified.

Depending on a distance between the user and upper display module 110, an interval between the left eye and the right eye of the user, and slits formed in barrier liquid crystal 113, regions of LCD panel 112 which can be viewed by the left eye and the right eye of the user respectively vary. Therefore, slits in barrier liquid crystal 113 are controlled by obtaining a condition of the user facing upper display module 110. Control of this stereoscopic display will be described in detail in <e1: Barrier Control Function> which will be described later.

Upper display module 110 can provide not only stereoscopic display but also two-dimensional display (non-stereoscopic display). In this case, a method of inactivating slits in barrier liquid crystal 113 and a method of setting a parallax between the image for left eye and the image for right eye to substantially zero are available.

In the case of the former method, light from LCD panel 112 incident on the left eye and the right eye of the user is substantially made identical by setting a width of non-passage region 113b of barrier liquid crystal 113 to substantially zero. Thus, the user views an image without parallax with the left eye and the right eye and hence two-dimensional display is provided to the user.

In the case of the latter method, the image visually recognized by the user's left eye and the image visually recognized by the user's right eye are controlled to be substantially the same.

Though a parallax barrier type display device has been exemplified by way of a typical example of a display capable of providing stereoscopic display, for example, a lenticular type display device or the like can also be adopted. According to such a type, a display area for an image for left eye and a display area for an image for right eye are arranged in a certain pattern (typically, alternately). Alternatively, such a form that an image for left eye and an image for right eye are displayed in a temporally switched manner with a display area for the image for left eye and a display area for the image for right eye being common may also be adopted, as in the method of utilizing shutter glasses (time-division type).

<c7: Configuration of Lower Display Module 120 of Game Device 100>

A configuration of lower display module 120 of game device 100 will now be described.

Figure 14:
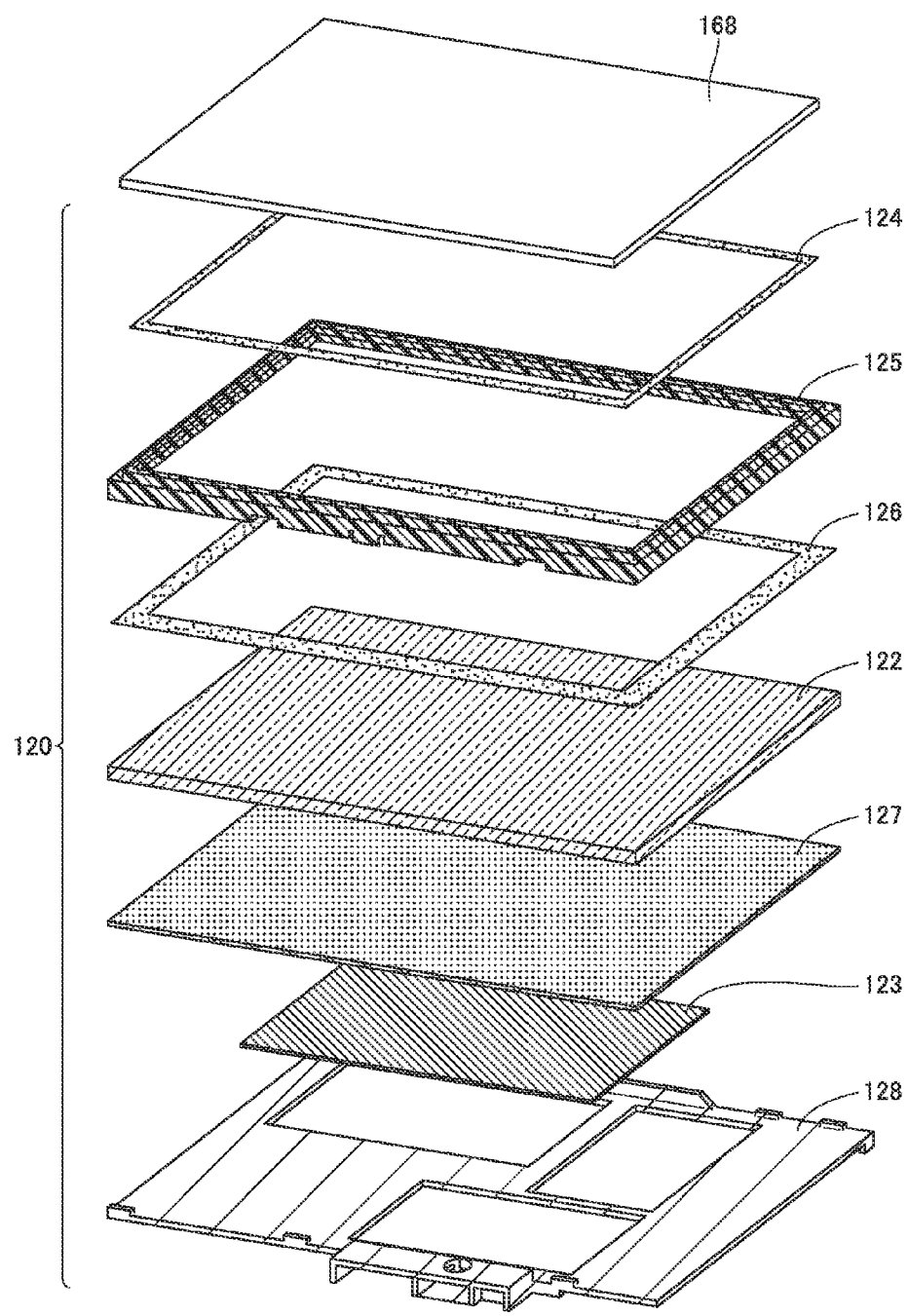
FIG. 14 shows an exemplary illustrative non-limiting exploded perspective view illustrating a lower display module of the game device according to the present embodiment.

Referring to FIG. 14, lower display module 120 includes a touch panel fixing double-faced tape 124, an upper frame 125, a fixing double-faced tape 126, LCD panel 122, an antenna support sheet 127, antenna 123, and a lower frame 128.

Lower display module 120 of game device 100 includes not only LCD panel 122 but also antenna 123 for establishing non-contact communication. More specifically, lower display module 120 is fixed as upper frame 125 and lower frame 128 sandwich LCD panel 122, antenna support sheet 127, and antenna 123.

Non-contact communication refers to a technique for exchanging information by radio at a distance approximately from several cm to several m, and it is typically implemented under international specifications referred to as near field communication (NFC). Specific application examples include a radio tag called radio frequency identifier (RFID) and an IC card.

Touch panel 168 is arranged on the upper surface of lower display module 120. Touch panel 168 is bonded to upper frame 125 by touch panel fixing double-faced tape 124.

Upper frame 125 is formed of a resin, in consideration of influence on electromagnetic waves radiated from antenna 123 or received from antenna 123. Namely, when upper frame 125 is formed of a metal representing a conductor, transmission and reception of electromagnetic waves through antenna 123 may adversely be affected. On the other hand, since upper frame 125 is an important part for fixing lower display module 120, strength is preferably enhanced by using a hard resin and mixing glass fibers therein.

Upper frame 125 and LCD panel 122 are bonded to each other with the use of fixing double-faced tape 126.

Antenna 123 is arranged on lower frame 128. Antenna 123 is smaller in two-dimensional size than LCD panel 122. Antenna support sheet 127 is arranged between LCD panel 122 and antenna 123.

Antenna support sheet 127 is formed, for example, from a sheet made of a polyethylene terephthalate (PET) resin, and achieves an effect as below. Namely, antenna 123 is preferably arranged as high as possible (on a side of a display surface) so that exchange (reading/writing) of information is facilitated, whereas a halo of liquid crystal (for example, unevenness as caused when a display is pressed with a finger) is caused when LCD panel 122 and antenna 123 are in direct contact with each other. In particular, since antenna 123 is smaller in two-dimensional size than LCD panel 122, a halo of liquid crystal is likely in a portion corresponding to an end portion of antenna 123. Therefore, such a halo of liquid crystal is prevented by arranging antenna support sheet 127 as a cushion between LCD panel 122 and antenna 123.

Lower frame 128 has some cut portions formed, for avoiding interference with a component (not shown) of a substrate located on the rear side. By avoiding interference, an unnecessary space is reduced and a small thickness as a whole device is realized.

As described above, game device 100 according to the present embodiment adopts lower display module 120 integrally including antenna 123 for establishing non-contact communication. Thus, as the user simply holds a card or a figure containing an IC chip over lower display module 120, information stored in the IC chip can be read or information can be written in the IC chip. An application making use of exchange of information using such non-contact communication will be described later.

In incorporating antenna 123 in lower display module 120, upper frame 125 sandwiching antenna 123 and LCD panel 122 is formed of a non-conductive material (a resin in the present embodiment). Thus, influence on electromagnetic waves transmitted and received to and from antenna 123 can be lessened. When a size of upper frame 125 is sufficiently large as compared with a two-dimensional size of antenna 123, there is little electrical interference between antenna 123 and upper frame 125 and hence upper frame 125 may be formed of a metal higher in strength.

D. Portable Information Terminal 200

<d1: Overall Configuration of Portable Information Terminal 200>

An overall configuration of portable information terminal 200 according to the present embodiment will now be described.

Figure 15:
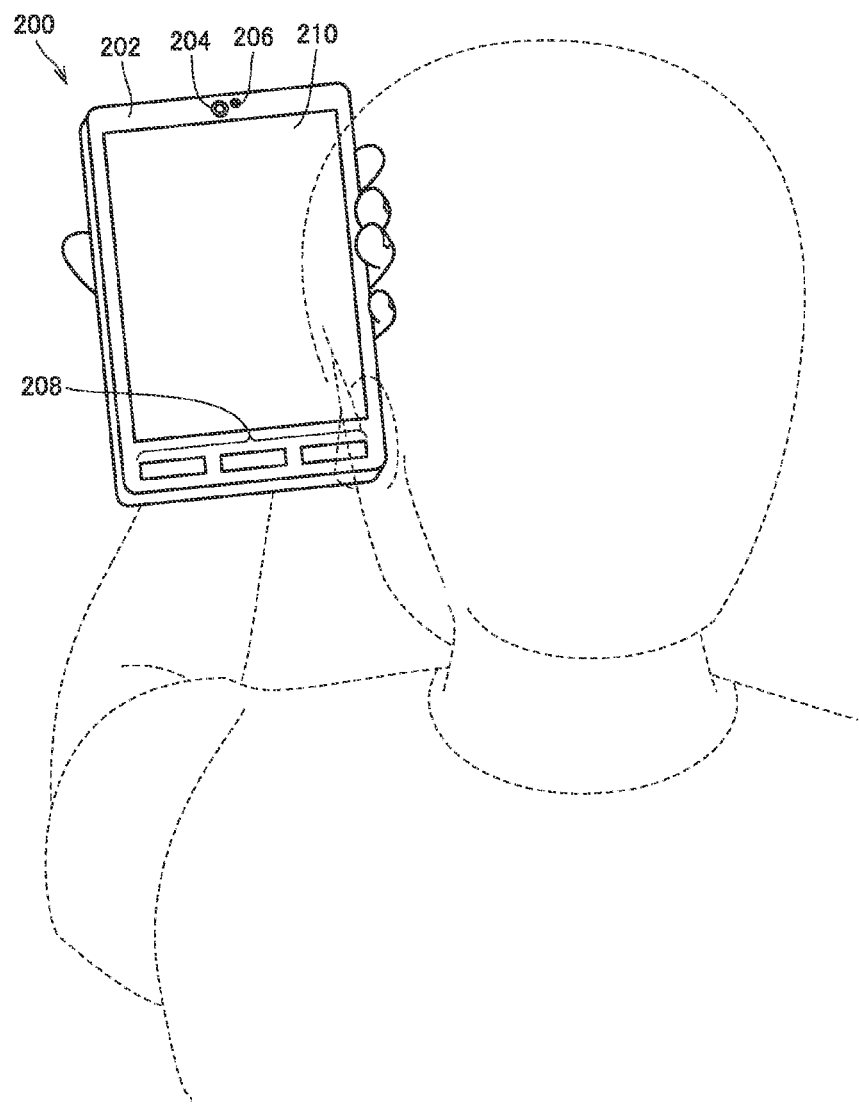
FIG. 15 shows an exemplary illustrative non-limiting schematic diagram illustrating a state of use of a portable information terminal according to the present embodiment.

Referring to FIG. 15, portable information terminal 200 is a tablet computer which can be held by a user even with one hand. Portable information terminal 200 includes a main body portion 202, an inner camera 204 arranged in an upper portion of main body portion 202, an infrared ray emission module 206, an input portion 208, and a display module 210. Display module 210 includes a touch panel, and the user provides various instructions to portable information terminal 200 based on a touch operation onto display module 210 in addition to input portion 208. Display module 210 can also provide stereoscopic display.

<d2: Electrical Configuration of Portable Information Terminal 200>

An electrical configuration of portable information terminal 200 according to the present embodiment will now be described.

Figure 16:
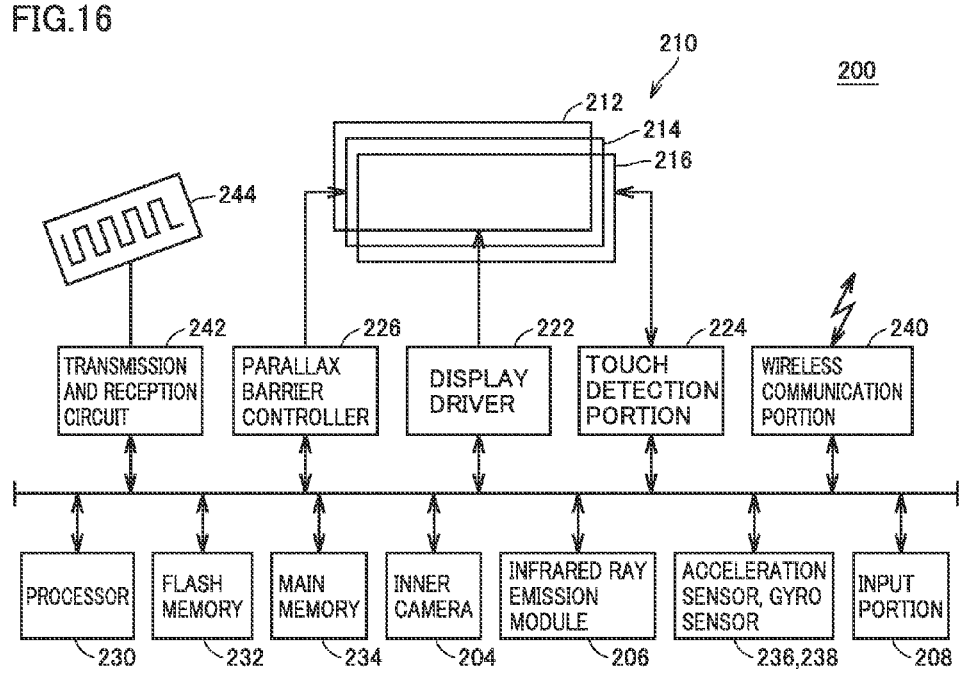
FIG. 16 shows an exemplary illustrative non-limiting block diagram illustrating an electrical configuration of the portable information terminal according to the present embodiment.

Referring to FIG. 16, portable information terminal 200 includes, as electrical configurations thereof, inner camera 204, infrared ray emission module 206, input portion 208, display module 210, a display driver 222, a touch detection portion 224, a parallax barrier controller 226, a processor 230, a flash memory 232, a main memory 234, an acceleration sensor 236, a gyro sensor 238, a wireless communication portion 240, a transmission and reception circuit 242, and an antenna 244. Display module 210 includes an LCD panel 212, a barrier liquid crystal 214, and a touch panel 216.

LCD panel 212, barrier liquid crystal 214, and touch panel 216 are similar to LCD panel 112, barrier liquid crystal 113, and touch panel 168 (FIG. 11) described above, respectively. Namely, display module 210 is a multiple-viewpoint display having an adjustable parallax barrier.

Display driver 222 drives LCD panel 212 in response to a command from processor 230. Touch detection portion 224 is connected to touch panel 216 and detects an operation by a user onto touch panel 216. Parallax barrier controller 226 controls barrier liquid crystal 214 in response to a command from processor 230. Namely, parallax barrier controller 226 provides stereoscopic display to a user facing the display in accordance with a position thereof by adjusting a position, a size (a width), or an interval of slits created in barrier liquid crystal 214.

Processor 230 reads an application program (including a system application and a user application) or a game program stored in flash memory 232 and develops such a program on main memory 234, and executes the program. Thus, processing as will be described below is realized.

Acceleration sensor 236 senses acceleration generated in portable information terminal 200 and outputs the result of sensing to processor 230. Gyro sensor 238 senses an inclination of portable information terminal 200 and outputs the result of sensing to processor 230.

Wireless communication portion 240 communicates with another device through public lines.

Transmission and reception circuit 242 and antenna 244 realize non-contact communication. Transmission and reception circuit 242 processes a wireless signal received through antenna 244 or generates a wireless signal in response to a command from processor 230 and transmits the wireless signal through antenna 244.

Since portable information terminal 200 is typically configured in accordance with a general-purpose architecture, detailed description of each component will not be provided here.

E. Function and Processing

A main function and processing incorporated in game device 100 and portable information terminal 200 will be described below. The entire function and processing described below do not have to be incorporated in a single device, and it should be interpreted that a device incorporating only a necessary function and processing is also encompassed within the technical scope of the invention of the subject application.

<e1: Barrier Control Function>

A barrier control function according to the present embodiment is a function for providing stereoscopic display without a user facing the display. Namely, the barrier control function provides stereoscopic display (for example, stereoscopic display at a point of view different from a point of view facing the display) to a user in accordance with a position thereof, with the use of a plurality of display images. In other words, the barrier control function modifies a manner of display of an image in accordance with relative positional relation between the display and the user.

Figure 17A:
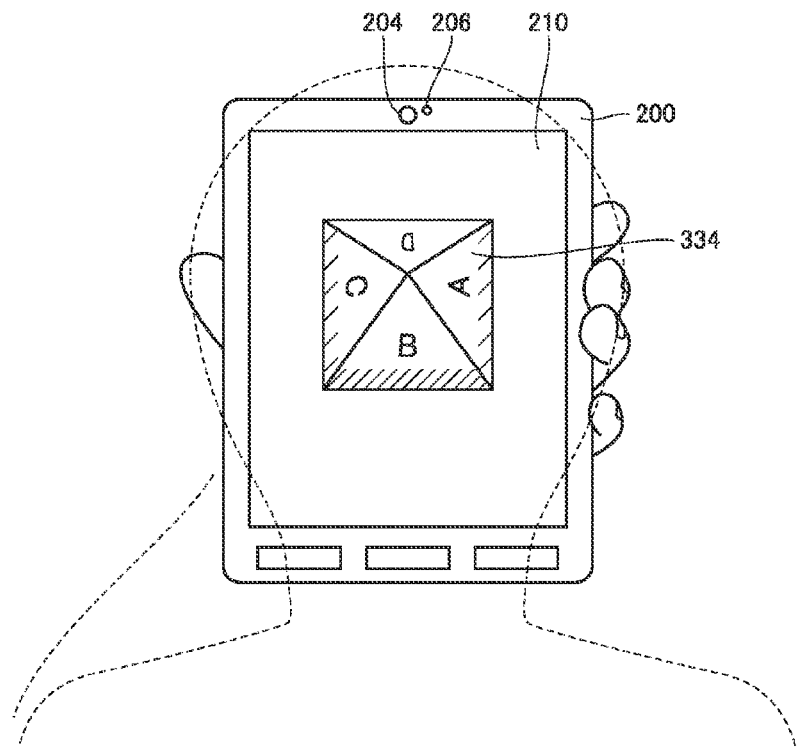
FIGS. 17A and 17B show exemplary illustrative non-limiting schematic diagrams each illustrating a barrier control function according to the present embodiment.
Figure 17B:
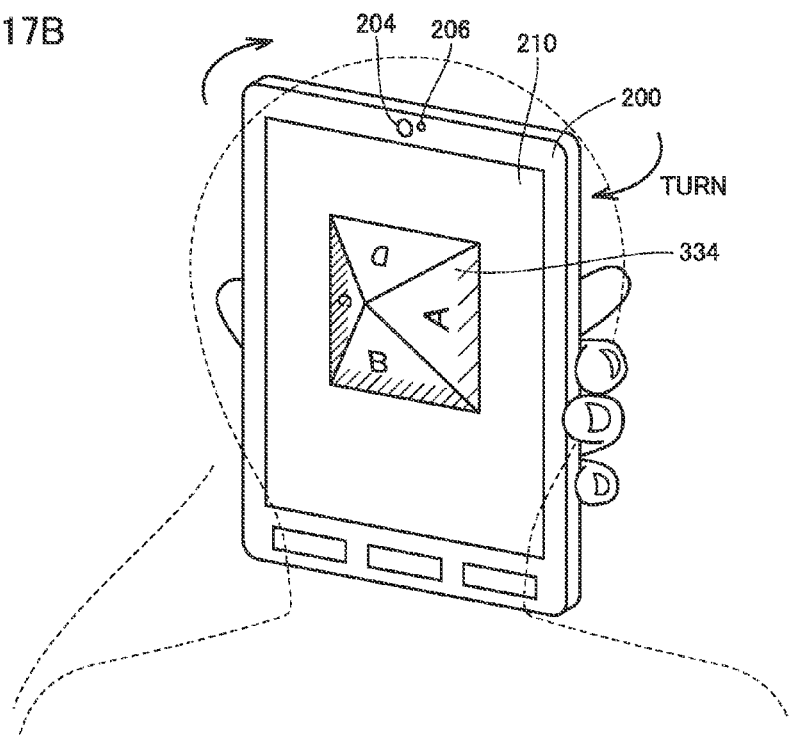

FIGS. 17A and 17B each show an example in which the barrier control function is incorporated in portable information terminal 200 by way of example, which is also the same as the case of incorporation in game device 100. FIG. 17A shows a state that the user faces portable information terminal 200 and FIG. 17B shows a state that the user turns portable information terminal 200 along a horizontal direction, that is, the user does not face portable information terminal 200.

In the state shown in FIG. 17A, display module 210 provides stereoscopic display of an object 334 of a quadrangular pyramidal cone, and in a state shown in FIG. 17B as well, display module 210 provides stereoscopic display of object 334 of the quadrangular pyramidal cone. Namely, portable information terminal 200 estimates relative positional relation between the display and the user based on an image resulting from image pick-up of the user and including infrared components (hereinafter also referred to as an "infrared image" or an "IR image"), and provides stereoscopic display with a line of sight in accordance with estimated relative positional relation being defined as the reference. In other words, stereoscopic display with a position in accordance with estimated relative positional relation being defined as a point of view is provided.

More specifically, as described with reference to FIGS. 12A, 12B, and 13, portable information terminal 200 provides stereoscopic display also to a user not facing the display by controlling slits in barrier liquid crystal 214. Though any method may be adopted as a technique for estimating relative positional relation between the display and the user, an image of the user is picked up by inner camera 204 (inner camera 133 in game device 100) and relative positional relation is estimated from the picked up image in the present embodiment.

Since the barrier control function controls slits in barrier liquid crystal 214, normally, a position of the user in the lateral direction of the display is employed as relative positional relation between the display and the user. In other words, a position of the user in the vertical direction of the display is not employed. Namely, a relative position of the user along a straight line connecting both eyes of the user to each other is sensed, and relative position thereof is used for barrier control.

Figure 18A:
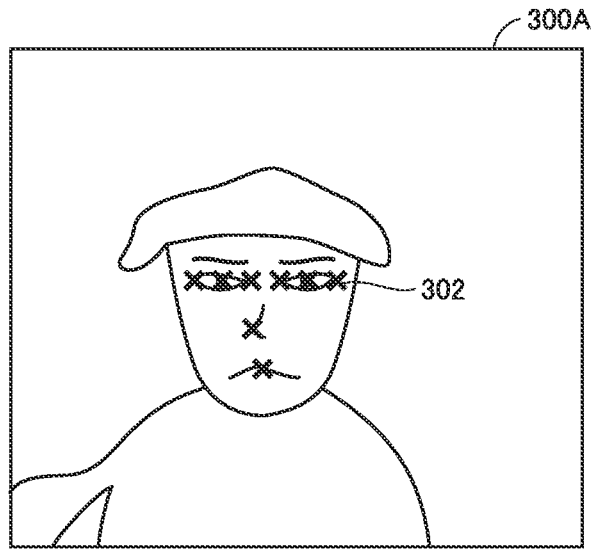
FIGS. 18A and 18B show exemplary illustrative non-limiting schematic diagrams each illustrating a processing example for estimating relative positional relation between a display and a user with the barrier control function according to the present embodiment.
Figure 18B:
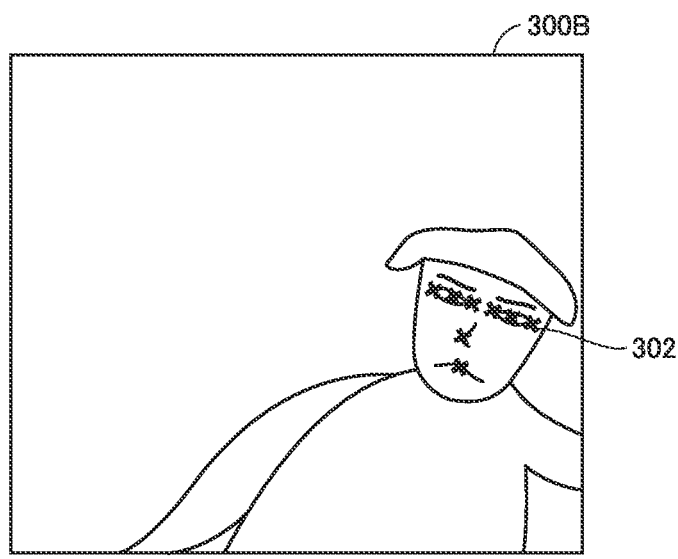

FIG. 18A shows one example of an input image picked up by the inner camera while a user faces the display, and FIG. 18B shows one example of an input image picked up by the inner camera while the user does not face the display.

With the barrier control function according to the present embodiment, a face recognition technique is used to specify a position or a region of a face of the user (eyes, nose, mouth, or contour) in a picked-up image and relative positional relation of the user is estimated based on information on the specified position or region. In particular, since positions of both eyes of the user are important in consideration of stereoscopic display, relative positional relation of the user is estimated based on the recognized positions of the eyes.

As shown in FIG. 18A, a feature point 302 indicating a portion of the face is sensed from a feature value included in an input image 300A. A plurality of sensed feature points 302 include also information on positions of the eyes. In input image 300A obtained while the user faces the display, the eyes of the user are present in the center of the image. In contrast, in an input image 300B obtained while the user does not face the display, the eyes of the user are present near the end of the image. The barrier liquid crystal (parallax barrier) is controlled such that a point of view in stereoscopic display is at a more suited position in accordance with thus recognized positions of the eyes of the user.

With the barrier control function according to the present embodiment, in order to enhance accuracy in face recognition, in addition to a visible light image (hereinafter also referred to as an "RGB image") generated through reception of light in a normal visible wavelength region, an IR image obtained through reception of reflected rays resulting from irradiation of a subject with infrared rays is employed. An IR image is obtained by emitting infrared rays from infrared ray emission module 132 in game device 100 and emitting infrared rays from infrared ray emission module 206 in portable information terminal 200. Thus, the inner camera arranged in proximity to the display includes an infrared camera. Since an IR image is used, accuracy in face recognition can be enhanced even in a dark environment.

Referring to FIG. 19, a barrier control function 310 is implemented by a binarization processing module 313, a face recognition module 314, a relative positional relation estimation module 315, and a parallax barrier control module 316. Each module shown in FIG. 19 is typically provided as the processor executes a program.

Binarization processing module 313 performs binarization processing with the use of luminance information of each pixel on an image including components in the infrared wavelength region and the visible wavelength region. Since more infrared rays are reflected from a user estimated to be close to the infrared ray emission module, a region corresponding to the user is relatively bright (exhibits a higher luminance value). Therefore, a region corresponding to the user and a region otherwise can be separated from each other through the binarization processing.

Face recognition module 314 performs face recognition processing on a binarized image from binarization processing module 313, and outputs a feature value included in the image and a result of recognition. A known technique can be employed for face recognition processing.

Relative positional relation estimation module 315 estimates relative positional relation between the display and the user based on information on positions of the eyes included in the result of recognition from face recognition module 314. Namely, relative positional relation estimation module 315 estimates relative positional relation from an image resulting from image pick-up of the user by the inner camera arranged in proximity to the display. Specifically, relative positional relation estimation module 315 calculates information on in which direction the user is located with the inner camera being defined as the reference and/or how distant the user is located, from the positions of the eyes of the user within the image resulting from image pick-up by the inner camera.

Parallax barrier control module 316 generates a command for adjusting slits in the barrier liquid crystal (parallax barrier) based on the relative positional relation from relative positional relation estimation module 315. This command is provided to display controller 111 of game device 100 or portable information terminal 200 parallax barrier controller 226 of portable information terminal 200.

As the plurality of modules shown in FIG. 19 are in coordination with each other, the barrier control function is implemented. Namely, the hand-held information processing terminal performs face recognition processing on an image resulting from image pick-up by the inner camera and senses positions of the eyes of the user facing the information processing terminal. The information processing terminal controls slits in the barrier liquid crystal (parallax barrier) (a position of the barrier) arranged on the side of the lower side surface of the LCD panel based on the sensed positions of the eyes of the user. Thus, the user can enjoy stereoscopic display even though he/she is not present in front of the information processing terminal.

<e2: Dimming Function>

A dimming function according to the present embodiment is a function to adjust brightness of the display in accordance with an environment of use of the information processing terminal.

Figure 20A:
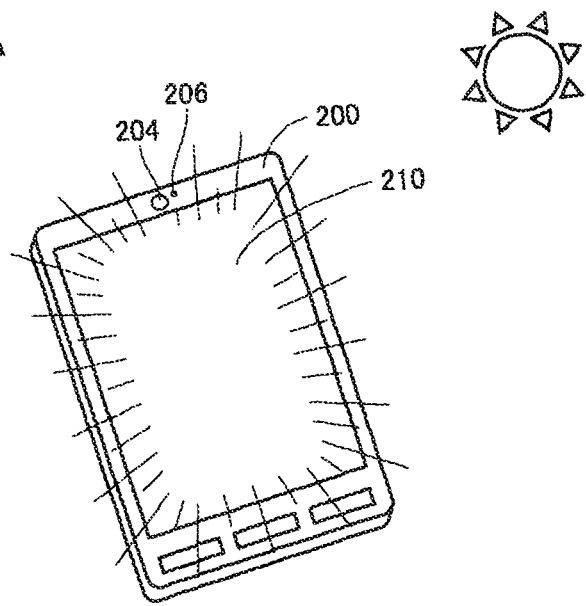
FIGS. 20A and 20B show exemplary illustrative non-limiting schematic diagrams each illustrating a dimming function according to the present embodiment.
Figure 20B:
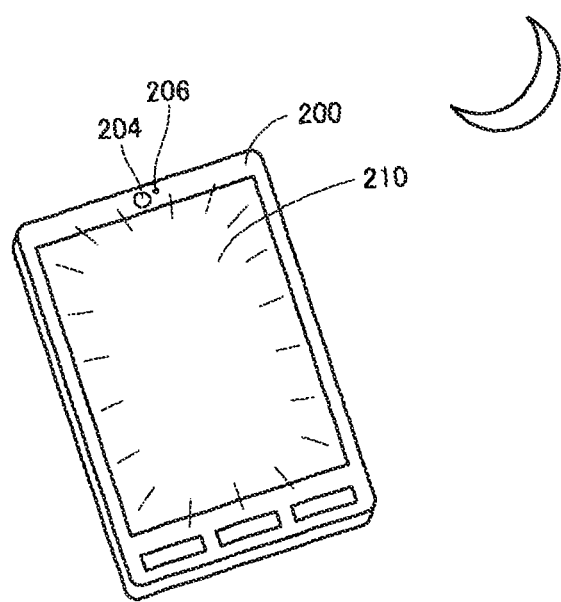

FIGS. 20A and 20B each show an example in which the dimming function is incorporated in portable information terminal 200 by way of example, which is also the same as the case of incorporation in game device 100. FIG. 20A shows a state that the user uses portable information terminal 200 in a bright environment, while FIG. 20B shows a state that the user uses portable information terminal 200 in a dark environment.

In use in the bright environment as shown in FIG. 20A, display module 210 of portable information terminal 200 is relatively bright, and in use in the dark environment as shown in FIG. 20B, display module 210 of portable information terminal 200 is relatively dark. Such a dimming function is implemented by adjusting an amount of light emission from the backlight in the case of a display module including an LCD panel. On the other hand, in a self-luminous device such as a display making use of EL, the dimming function is implemented by controlling a supply voltage or a supply current.

With the dimming function according to the present embodiment, a state of an ambient environment is obtained from an image resulting from image pick-up by the inner camera and appropriate brightness of the display module is determined. When a viewing angle of the inner camera is relatively large, an image of the rear of the user can also be picked up and hence information sufficient for determining a state of the ambient environment can be obtained.

Since an image obtained by the inner camera can periodically be obtained during execution of the barrier control function described above, such an image can also be made use of for the dimming function. Namely, though the dimming function according to the present embodiment may be performed alone at any timing, it is more preferably performed in parallel to the barrier control function described above.

Figure 21:
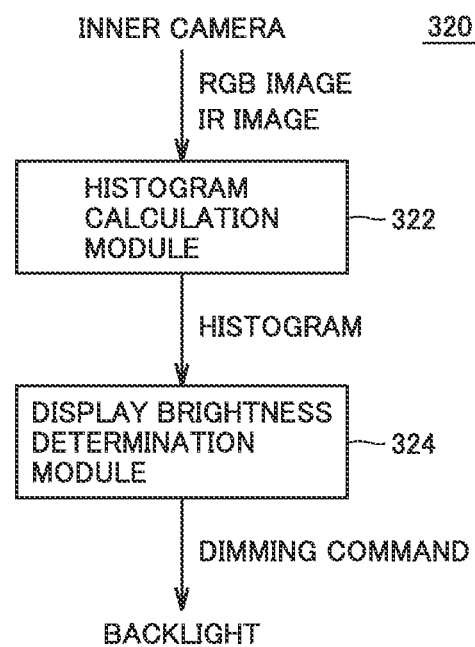
FIG. 21 shows an exemplary illustrative non-limiting functional block diagram illustrating one example in which the dimming function according to the present embodiment is implemented.

Referring to FIG. 21, a dimming function 320 is implemented by a histogram calculation module 322 and a display brightness determination module 324. Each module shown in FIG. 21 is typically provided as the processor executes a program.

Histogram calculation module 322 obtains an image resulting from image pick-up by the inner camera (an RGB image and/or an IR image) and calculates a histogram within the image. Namely, histogram calculation module 322 analyzes a degree of brightness within the obtained image. In execution in parallel to the barrier control function described above, histogram calculation module 322 preferably calculates a histogram of a region other than a region of the user extracted with the barrier control function, because the region other than the region of the user is considered to further reflect a state of the ambient environment.

Display brightness determination module 324 determines brightness of the display module based on the histogram from histogram calculation module 322. Display brightness determination module 324 generates a dimming command in accordance with determined brightness of the display module and outputs the dimming command to the backlight of the display module.

As the plurality of modules shown in FIG. 21 are in coordination with each other, the dimming function is implemented. Namely, the hand-held information processing terminal determines the ambient environment based on an image resulting from image pick-up by the inner camera and controls the display module so as to set brightness in accordance with the ambient environment.

<e3: Calibration Function>

A calibration function according to the present embodiment is a function to assist the barrier control function described above, and corrects estimated relative positional relation of a user. An error is caused in estimated relative positional relation due to an error in position of attachment of the inner camera. In order to correct this error, calibration of barrier control is preferably enabled. Basically, this calibration is desirably carried out only once, and a calculated amount of correction is used for processing for calculating subsequent relative positional relation.

FIGS. 22A and 22B each show an example in which the calibration function is incorporated in portable information terminal 200 by way of example, which is also the same as the case of incorporation in game device 100. FIG. 22A shows one example of an initial state of calibration and FIG. 22B shows one example of a state of completion of calibration.

Though the calibration function shown in FIGS. 22A and 22B may be executable during execution of any application, it is typically executable from a menu screen for making various types of setting. The user indicates start of the calibration function while portable information terminal 200 (or game device 100) is held such that the user himself/herself is accommodated in a range of a field of view of the inner camera. Then, stereoscopic display for calibration as shown in FIGS. 22A and 22B is provided.

Relative positional relation between the display and the user is estimated with the barrier control function described above, and stereoscopic display of object 334 for calibration is provided with a line of sight in accordance with estimated relative positional relation being defined as the reference.

In a screen, in addition to object 334, adjustment buttons 331 and 332 for calibration and an enter button 333 are displayed.

When a position of attachment of inner camera 204 is as designed, the user can view stereoscopic display of object 334 as shown in FIG. 22B. When there is an error in position of attachment of inner camera 204, however, as shown in FIG. 22A, slits in the barrier liquid crystal are set as being displaced and hence flickering in stereoscopic display of object 334 is felt. In such a case, the user presses adjustment button 331 or 332 until stereoscopic display of object 334 no longer flickers. Namely, the user adjusts an amount of correction for estimated relative positional relation by operating the touch panel of display module 210. Then, when stereoscopic display of object 334 no longer flickers, the user presses enter button 333 so as to set an amount of correction. The calibration function according to the present embodiment determines an amount of correction for estimated relative positional relation (that is, recognized positions of the eyes) in response to an operation by the user.

When adjustment button 331 or 332 is pressed, an amount of correction in accordance therewith is added to/subtracted from estimated relative positional relation. Slits in the barrier liquid crystal are adjusted in accordance with corrected relative positional relation. By adjusting slits in the barrier liquid crystal, an appropriate image for right eye is incident on the right eye of the user and an appropriate image for left eye is incident on the left eye.

Figure 23:
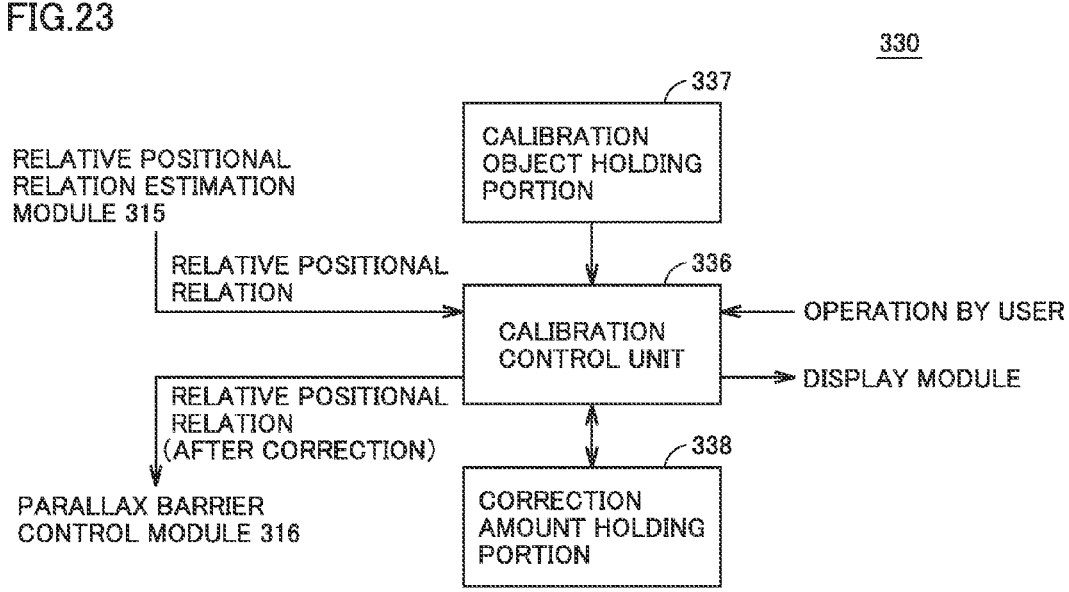
FIG. 23 shows an exemplary illustrative non-limiting functional block diagram illustrating one example in which the calibration function according to the present embodiment is implemented.

Referring to FIG. 23, a calibration function 330 is implemented by a calibration control unit 336, a calibration object holding portion 337, and a correction amount holding portion 338. Each module shown in FIG. 23 is typically provided as the processor executes a program.

Calibration object holding portion 337 holds data for stereoscopic display of an object for calibration (object 334 shown in FIGS. 22A and 22B). Correction amount holding portion 338 holds an amount of correction for relative positional relation estimated by relative positional relation estimation module 315.

Calibration control unit 336 controls the calibration function according to the present embodiment. More specifically, calibration control unit 336 reads data from calibration object holding portion 337 and provides a command for displaying a calibration screen as shown in FIGS. 22A and 22B to the display module, in response to an operation for starting the calibration function from the user. In the calibration screen as shown in FIGS. 22A and 22B, in response to pressing of adjustment button 331 or 332 by the user, calibration control unit 336 updates an amount of correction held in correction amount holding portion 338, corrects relative positional relation from relative positional relation estimation module 315 (FIG. 19) with the updated amount of correction, and outputs resultant relative positional relation to parallax barrier control module 316 (FIG. 19). Parallax barrier control module 316 controls the barrier liquid crystal based on corrected relative positional relation.

When enter button 333 shown in FIGS. 22A and 22B is pressed, calibration control unit 336 confirms the amount of correction held in correction amount holding portion 338 and quits calibration processing. Then, calibration control unit 336 corrects relative positional relation output from relative positional relation estimation module 315 with the amount of correction held in correction amount holding portion 338 while the barrier control function is activated, and outputs corrected relative positional relation to parallax barrier control module 316.

With such a calibration function, even when a position of attachment of the inner camera is erroneous, more appropriate stereoscopic display can be provided to the user.

<e4: Update of Display Contents in Accordance With Line of Sight>

Game device 100 and portable information terminal 200 in the present embodiment can update display contents in accordance with a line of sight of a user. Namely, game device 100 and portable information terminal 200 generate a plurality of display images in accordance with relative positional relation between the display and the user. In other words, game device 100 and portable information terminal 200 modify a displayed image in accordance with relative positional relation. For the sake of convenience of description, such a function is referred to as a motion parallax function.

Referring again to FIG. 17B, it can be seen that how object 334 stereoscopically displayed on portable information terminal 200 is viewed varies after the user has turned portable information terminal 200, that is, while the user does not face portable information terminal 200. Namely, in FIG. 17B, object 334 is expressed at a point of view different from that in FIG. 17A. Thus, game device 100 and portable information terminal 200 in the present embodiment can update display contents in accordance with a line of sight of the user.

(1. Method of Sensing Line of Sight of User)

Initially, a method of sensing a line of sight of a user will be described. Typically, a line of sight of a user may be sensed with the use of positions of the eyes of the user which have been made use of in the barrier control function described above. Namely, the motion parallax function according to the present embodiment recognizes positions of the eyes of the user from an image resulting from image pick-up of the user by the inner camera and senses a line of sight of the user with respect to the display (an angle of the line of sight with the display being defined as the reference) from these recognized positions of the eyes. In other words, the motion parallax function controls a position of a point of view at which stereoscopic display provided on the display can visually be recognized, in accordance with relative positional relation.

Alternatively, a line of sight of the user may be sensed with a method different from the barrier control function. For example, a position of a head of the user may be recognized based on an image resulting from image pick-up of the user by the inner camera and a line of sight of the user with respect to the display may be sensed based on this recognized position of the head. Further alternatively, a marker may be attached to the user in advance and a position of the marker in the image picked up by the inner camera may be sensed.

As a yet another method, a plurality of distance sensors (for example, infrared, ultrasonic, and magnetic) arranged around the display may be used to sense relative positional relation of the user with the display being defined as the reference, and a line of sight of the user may be determined based on this relative positional relation.

As a still another method, acceleration sensors 148 and 236, gyro sensors 149 and 238, or a geomagnetic sensor may be used to sense an inclination of the information processing terminal, and a line of sight of the user may be determined based on this inclination of the information processing terminal.

Furthermore, any two or more of the plurality of methods described above may be combined.

(2. Method of Using Object Arranged in Virtual Space)

A method of updating display contents in accordance with a sensed line of sight of a user will now be described. By way of example, processing for generating a plurality of display images used for stereoscopic display by picking up images of an object arranged in a virtual space with a plurality of virtual cameras arranged at positions in accordance with relative positional relation will be described.

Figure 24A:
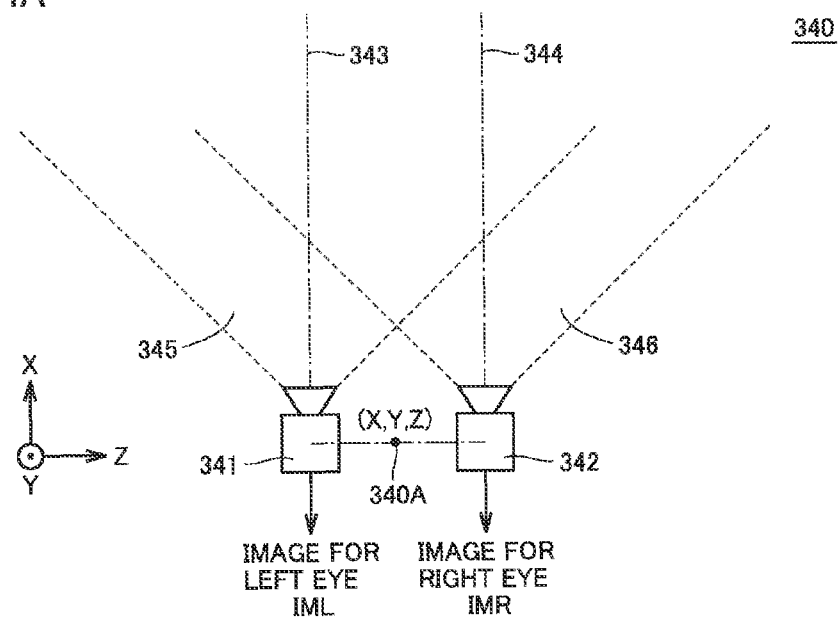

Referring to FIG. 24A, virtual cameras 341 and 342 are arranged in a virtual space 340. Virtual cameras 341 and 342 pick up images of an object in field-of-view ranges 345 and 346 within virtual space 340 and generate an image for left eye IML and an image for right eye IMR, respectively. Virtual camera 341 and virtual camera 342 are spaced away from each other by a certain distance in a direction orthogonal to respective directions of lines of sight 343 and 344 of virtual cameras 341 and 342. A parallax is created between image for left eye IML and image for right eye IMR in accordance with a difference in distance between virtual camera 341 and virtual camera 342. Stereoscopic display is provided by using such image for left eye IML and image for right eye IMR.

Figure 24B:
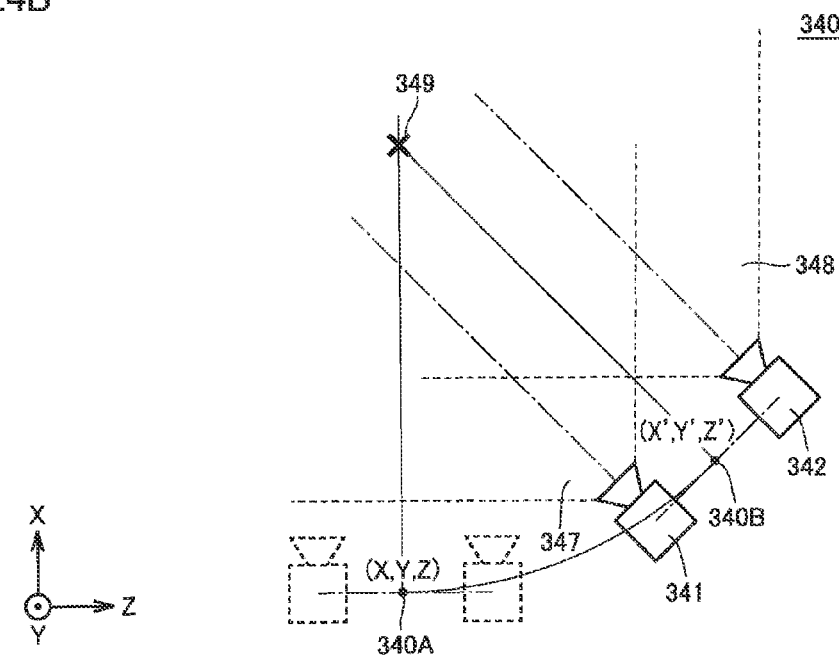

Display contents are updated by moving virtual cameras 341 and 342 in accordance with the sensed line of sight of the user. FIG. 24B shows a state that positions of virtual cameras 341 and 342 are modified. More specifically, virtual cameras 341 and 342 move in accordance with an angle of the sensed line of sight of the user, that is, the line of sight with the display being defined as the reference. Namely, the motion parallax function has virtual cameras 341 and 342 move in accordance with relative positional relation.

When a point of regard 349 is predetermined in the virtual space, in moving virtual cameras 341 and 342, a distance to point of regard 349 is preferably maintained constant before and after movement. Point of regard 349 is a point in the virtual space serving as the reference in stereoscopic display, and a stereoscopic effect felt by the user or a field of view varies depending on a distance between point of regard 349 and virtual cameras 341 and 342. Therefore, a position of point of regard 349 and/or a distance between point of regard 349 and virtual cameras 341 and 342 is/are determined as appropriate in accordance with an application to be executed (various applications as will be described later), each situation (a scene) of the executed application, or a mode set by the user (for example, a point of view selected by the user among a plurality of points of view from which selection can be made).

Relation between sensed relative positional relation and an amount of movement of virtual cameras 341 and 342 is also determined as appropriate in accordance with an application to be executed, each situation (a scene) of the executed application, or a mode set by the user.

Positions of virtual cameras 341 and 342 after movement thereof are determined such that a distance from a midpoint of a line connecting both cameras to each other to point of regard 349 is maintained constant. Namely, virtual cameras 341 and 342 are positioned such that a distance between a midpoint 340A and point of regard 349 before movement matches with a distance between a midpoint 340B and point of regard 349 after movement. In other words, the motion parallax function has virtual cameras 341 and 342 turn in accordance with relative positional relation while a distance from predetermined point of regard 349 in the virtual space is maintained constant.

A distance between midpoint 340B and point of regard 349 may be increased or decreased at a prescribed ratio in accordance with an angle.

Since a position of point of regard 349 is determined in accordance with a type of an application to be executed or a mode selected by the user, a distance from point of regard 349 to virtual cameras 341 and 342 is different depending on an application to be executed and/or a mode of the application.

Since an amount of movement of the plurality of virtual cameras in accordance with sensed relative positional relation is also determined in accordance with a type of an application to be executed or a mode selected by the user, an amount of movement in accordance with relative positional relation of the plurality of virtual cameras corresponding to the same relative positional relation is different depending on an application to be executed and/or a mode of the application.

The motion parallax function has virtual cameras 341 and 342 turn in accordance with relative positional relation with the point of regard in the virtual space being defined as the reference. By maintaining a distance from point of regard 349, an object can more naturally be expressed.

Though movement of virtual cameras 341 and 342 is two-dimensionally drawn in FIGS. 24A and 24B for simplification of description, the virtual cameras can actually be moved three-dimensionally. Namely, a line of sight of the user with the display being defined as the reference can be expressed as a solid angle, and virtual cameras 341 and 342 can be moved along two axes in accordance with this solid angle. Namely, a displayed image may be different between a case that the user looks into the display in the lateral direction and a case that the user looks into the display in the vertical direction. For simplification of processing, however, only one of the lateral direction and the vertical direction may be sensed.

Virtual cameras 341 and 342 may be moved in a direction of line of sight of the virtual cameras in accordance with a recognized distance between both eyes of the user. By adopting such processing, the virtual cameras also come closer to the point of regard when the user brings his/her face toward the display, and the virtual cameras also move away from the point of regard when the user moves his/her face away from the display on the contrary.

Positions of the eyes of the user can be sensed based on an image resulting from image pick-up by the inner camera and the sensed positions of the eyes can be used for both of the barrier control function and the motion parallax function. In the barrier control function, however, information on positions of the eyes in the lateral direction of the display is used, and in the motion parallax function, information on positions of the eyes in the vertical and lateral directions of the display is used. Therefore, when the user looks into the display from above or below, display contents thereof are updated, however, slits formed in the barrier liquid crystal are not modified.

Though FIGS. 24A and 24B each show a processing example in which virtual cameras 341 and 342 are moved with a distance to point of regard 349 being maintained constant, from a point of view of simplification of processing, a direction of movement may be restricted. FIGS. 25A and 25B each show a processing example in which virtual cameras 341 and 342 are moved in a direction orthogonal to directions of lines of sight 343 and 344. Namely, virtual cameras 341 and 342 move along an extension of a line connecting virtual camera 341 and virtual camera 342 to each other.

When FIGS. 25A and 25B are compared with each other, field-of-view ranges 345 and 346 of virtual cameras 341 and 342 before movement match on a far clip plane FC with field-of-view ranges 347 and 348 of virtual cameras 341 and 342 after movement, respectively. Namely, by maintaining continuity of each field-of-view range on far clip plane FC in moving virtual cameras 341 and 342, an object can more naturally be expressed. By adopting the method shown in FIGS. 25A and 25B, a time period required for rendering of an object can further be shortened and faster rendering processing can be implemented. Thus, the motion parallax function has virtual cameras 341 and 342 move in accordance with relative positional relation in a direction parallel to a plane including the point of regard in the virtual space.

Figure 26:
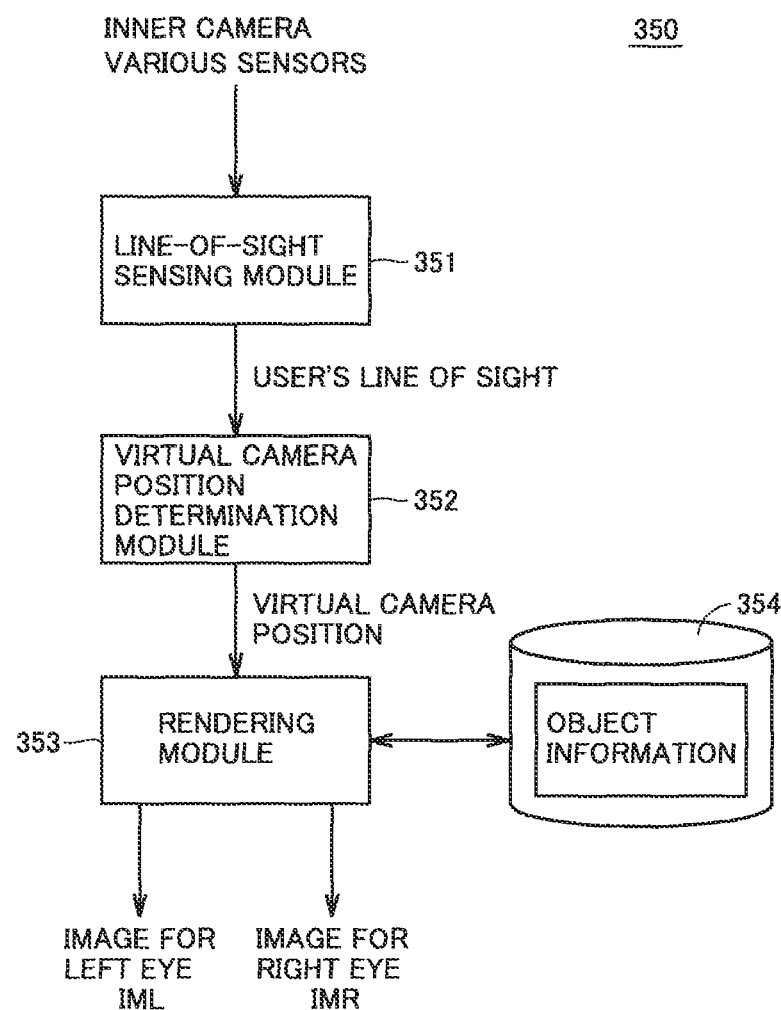
FIG. 26 shows an exemplary illustrative non-limiting functional block diagram illustrating one example in which the motion parallax function according to the present embodiment is implemented.

Referring to FIG. 26, a motion parallax function 350 is implemented by a line-of-sight sensing module 351, a virtual camera position determination module 352, a rendering module 353, and an object information storage module 354. Each module shown in FIG. 26 is typically provided as the processor executes a program.

Line-of-sight sensing module 351 senses a line of sight of the user. More specifically, line-of-sight sensing module 351 senses a line of sight of a user with respect to the display based on an image of the user picked up by the inner camera and/or a signal from a distance sensor, an acceleration sensor, a gyro sensor, or a geomagnetic sensor.

Virtual camera position determination module 352 determines positions of a plurality of virtual cameras arranged in the virtual space based on the line of sight of the user from line-of-sight sensing module 351.

Rendering module 353 generates image for left eye IML and image for right eye IMR by rendering an object arranged in the virtual space. Namely, rendering module 353 generates a plurality of display images in accordance with relative positional relation. More specifically, rendering module 353 has a plurality of virtual cameras arranged at positions in the virtual space designated by virtual camera position determination module 352 and has the plurality of virtual cameras pick up images of the object in the virtual space in accordance with object information stored in object information storage module 354. Thus, a plurality of display images are generated based on image pick-up of the object arranged in the virtual space by the plurality of virtual cameras arranged at positions in accordance with relative positional relation.

Virtual camera position determination module 352, rendering module 353, and object information storage module 354 may be provided as a part of an application, and in such a case, information on an object to be displayed is successively updated as the application is executed.

Though a configuration in which two virtual cameras are arranged in the virtual space has been exemplified in the description above, more than two virtual cameras may be arranged in the virtual space when stereoscopic display is provided with the use of more parallax images.

(3. Method of Using Image of Real World)

A method of updating display contents in accordance with a line of sight of a user with the use of an image of real world will now be described. For example, an image of real world can be obtained by picking up an image of some subject with the use of an outer camera. Since a pair of input images (an image for left eye and an image for right eye) can be obtained at a time in using outer cameras 131L and 131R mounted on game device 100, these images can be used.

Without being limited to such a form, a plurality of display images for providing stereoscopic display may be generated with the use of a single image resulting from image pick-up of a subject by a single camera.

Figure 27A:
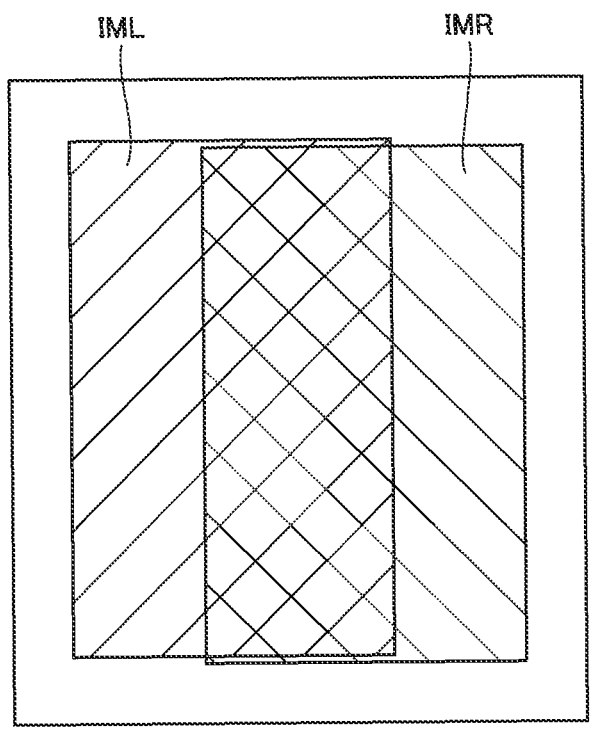
FIGS. 27A and 27B show exemplary illustrative non-limiting schematic diagrams each illustrating processing for providing stereoscopic display with the use of a single image with the motion parallax function according to the present embodiment.
Figure 27B:
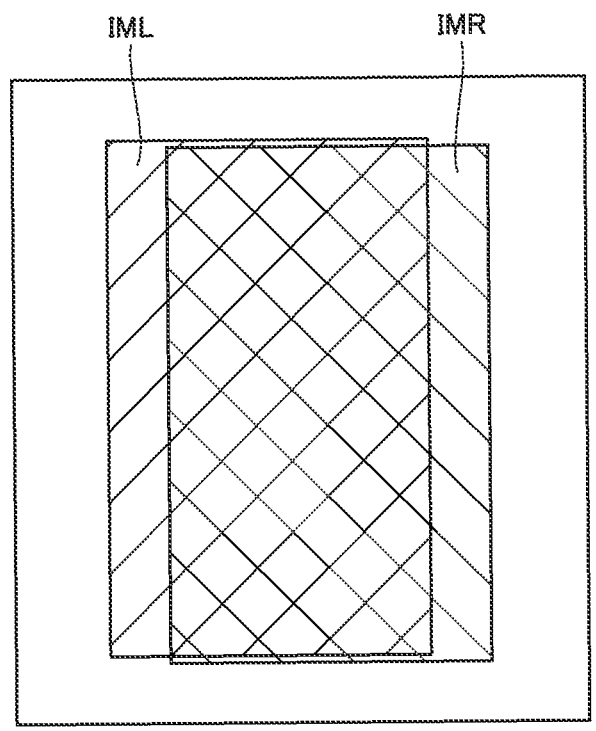

Referring to FIGS. 27A and 27B, a single image resulting from image pick-up of a subject by a single camera is defined as image for left eye IML and image for right eye IMR, and these images are displayed at a prescribed interval from each other. The user can enjoy stereoscopic display based on a parallax created by a difference in display position between image for left eye IML and image for right eye IMR. FIG. 27A shows a state that an amount of parallax is relatively large, that is, a state that an amount of pop-up from the display is large. On the other hand, FIG. 27B shows a state that an amount of parallax is relatively small, that is, an amount of pop-up from the display is small.

As described above, when stereoscopic display is provided with the use of a plurality of display images resulting from image pick-up of a subject from different points of view by a plurality of cameras or a plurality of display images generated from an image resulting from image pick-up of a subject by a single camera, the motion parallax function can be implemented with a method as below.

Figure 28A:
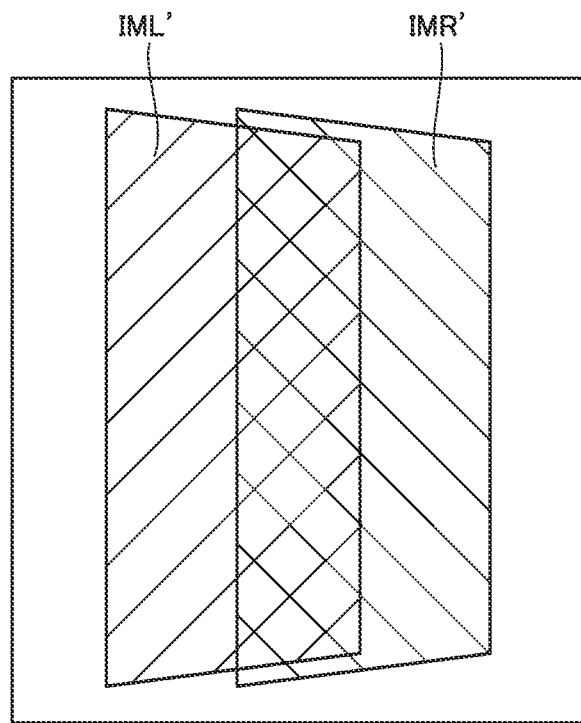
FIGS. 28A and 28B show exemplary illustrative non-limiting schematic diagrams each illustrating a method using a pair of input images in the motion parallax function according to the present embodiment.
Figure 28B:
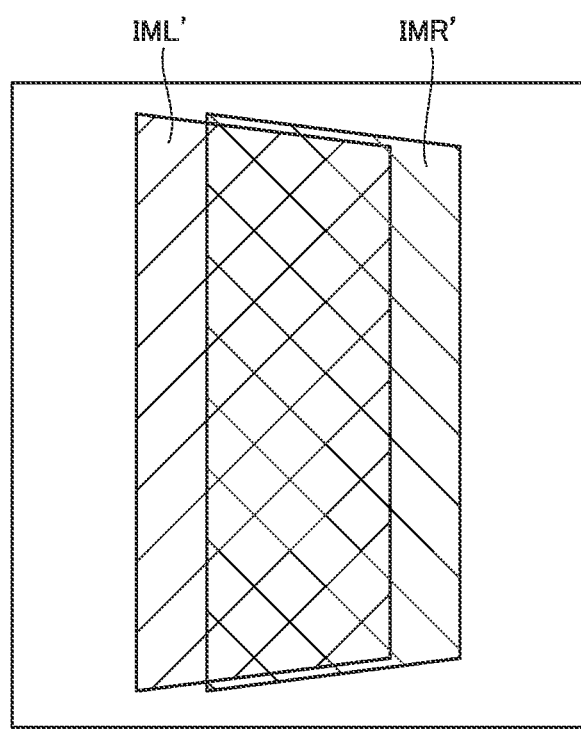

Referring to FIGS. 28A and 28B, through geometric transformation of image for left eye IML and image for right eye IMR in accordance with a line of sight of a user, transformed image for left eye IML' and image for right eye IMR' are generated. By displaying image for left eye IML' and image for right eye IMR' at respective positions, the user can enjoy stereoscopic display of the image in accordance with the line of sight of the user.

In using image for left eye IML' and image for right eye IMR' as well, an amount of pop-up from the display (a stereoscopic effect) can be adjusted by differing an amount of displacement in display as shown in FIGS. 28A and 28B.

Referring to FIG. 29, a motion parallax function 360 is implemented by a line-of-sight sensing module 361, a transformation function determination module 362, and an image transformation module 363. Each module shown in FIG. 29 is typically provided as the processor executes a program.

Line-of-sight sensing module 361 senses a line of sight of the user. More specifically, line-of-sight sensing module 361 senses a line of sight of the user with respect to the display based on an image of the user picked up by the inner camera and/or a signal from a distance sensor, an acceleration sensor, a gyro sensor, or a geomagnetic sensor.

Transformation function determination module 362 determines a transformation function for geometric transformation based on the line of sight of the user from line-of-sight sensing module 361.

Image transformation module 363 subjects an image from the inner camera and/or the outer camera to geometric transformation in accordance with the transformation function determined by transformation function determination module 362 to thereby generate image for left eye IML and image for right eye IMR.

(4. Summary)

According to the motion parallax function in the present embodiment, a line of sight of a user is sensed and display contents in accordance with the line of sight are displayed. With this motion parallax function, by looking into the display of the information processing terminal from any direction of above, below, left, and right, the user can view an image in accordance with a direction into which he/she looks and can further enjoy a sense of reality.

According to the present embodiment, the motion parallax function can be implemented only with a single image resulting from image pick-up of a subject by a single camera. Namely, since a plurality of cameras are not required, cost for a device can advantageously be reduced.

<e5: Non-Contact Communication>

Game device 100 and portable information terminal 200 according to the present embodiment can establish non-contact communication with a storage medium storing prescribed data.

By using a non-contact communication function, simply by holding a card or figure containing an IC chip, information stored in the IC chip can be read and information can be written in the IC chip. Reading and writing of information from and in such an IC chip are carried out during execution of an application. For example, as the user holds an IC card incorporating a function of electronic money over the display in purchasing some item during execution of an application, payment processing necessary for purchase is completed.

Alternatively, in downloading an application by accessing a server as well, payment processing necessary for downloading (purchase) of an application may be performed by holding an IC card over the display.

In game device 100 according to the present embodiment, antenna 123 necessary for non-contact communication is arranged in lower display module 120 (see FIG. 14). When the user holds a figure containing an IC chip over lower display module 120, display or audio output in accordance with information stored in the IC chip may be provided. For example, an image (a still image or moving images) of a character corresponding to a figure may be displayed on upper display module 110 and/or lower display module 120 based on information stored in the IC chip contained in the figure. Furthermore, a name or a profile of the figure may be displayed on upper display module 110 and/or lower display module 120, or an audio message associated with the figure may be output.

For example, under the NFC forum, three modes of a card emulation mode in which a function like an IC card is performed, a reader writer mode in which information is read from and written in a device, and a P2P mode in which terminals incorporating NFC communicate with each other are defined. In these three modes, a mode may automatically be selected in accordance with a launched application, or a mode may be selected within an application in accordance with an input operation by a user or a condition of execution of the application. All of these three modes may be incorporated, or only the reader writer mode may be incorporated.

Alternatively, when two modes of the card emulation mode and the reader writer mode are incorporated, an antenna may be mounted on a position suitable for each mode.

Figure 30A:
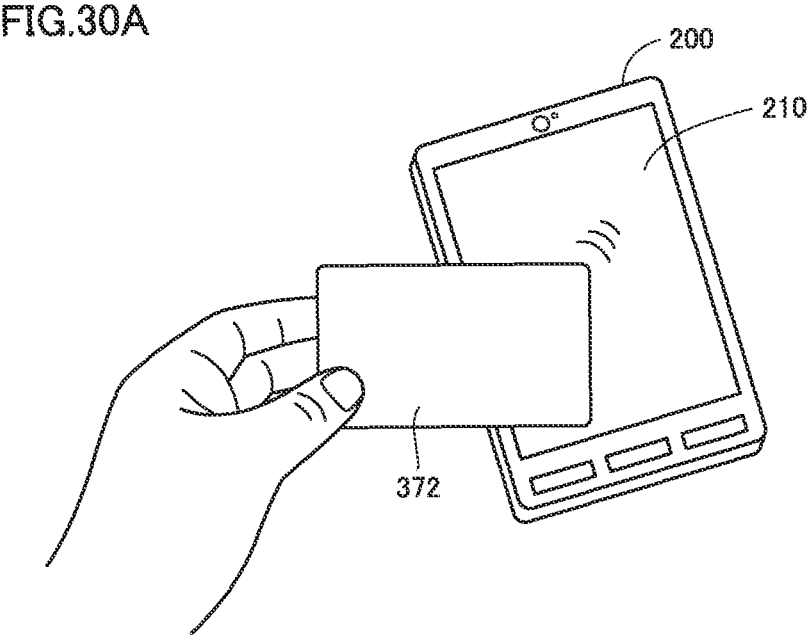
FIGS. 30A and 30B show exemplary illustrative non-limiting schematic diagrams each illustrating one example of non-contact communication of the portable information terminal according to the present embodiment.
Figure 30B:
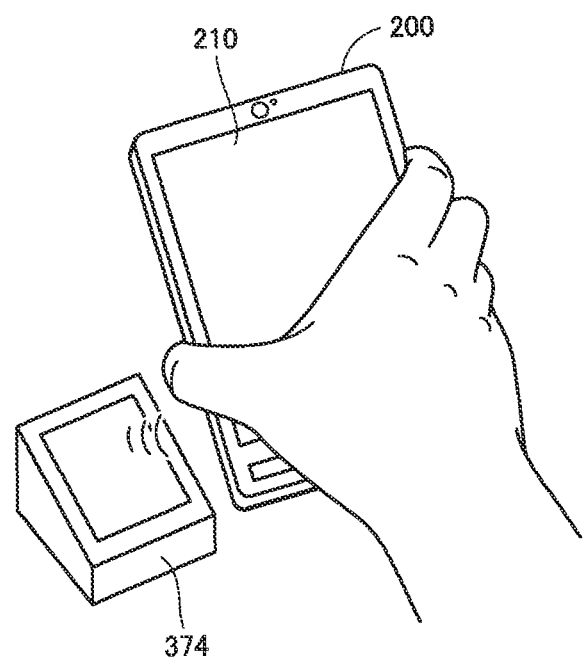

FIG. 30A shows a form in which portable information terminal 200 is used in the reader writer mode and FIG. 30B shows a form in which portable information terminal 200 is used in the card emulation mode.

As shown in FIG. 30A, in reading information from an IC card 372, the user holds IC card 372 over a front side of portable information terminal 200 (a side of display module 210). In contrast, as shown in FIG. 30B, when portable information terminal 200 itself is to function as the IC card, the user holds the rear surface of portable information terminal 200 over a reader writer 374. Alternatively, as a form of use on the contrary, a front surface of portable information terminal 200 may be held over reader writer 374 and IC card 372 may be held over the rear surface of portable information terminal 200.

By thus differing functions between the front surface and the rear surface of portable information terminal 200, convenience of the user can be enhanced. Though description in connection with portable information terminal 200 has been given with reference to FIGS. 30A and 30B, similar implementation can be made also in game device 100. In order to implement a form of use as shown in FIGS. 30A and 30B, an antenna is preferably arranged on each of the front side and the rear side of portable information terminal 200, however, implementation with a single antenna is also applicable.

<e6: Activation/Inactivation of Wireless Communication and Non-Contact Communication>

Game device 100 and portable information terminal 200 according to the present embodiment incorporate a wireless communication function under a wireless LAN scheme complying with such standards as IEEE802.11a/b/g/n and a non-contact communication function such as NFC. For example, in an aircraft, such a communication function should be inactivated (a state that no radio wave is emitted). Though each communication function may independently be inactivated, there is also a case that these communication functions can more preferably be inactivated at a time. A function allowing simultaneous activation/inactivation of wireless communication and non-contact communication will be described below.

Figure 31A:
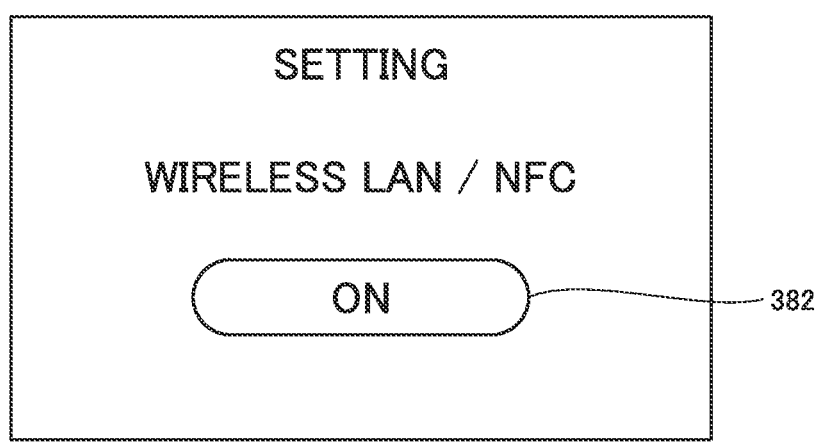
FIGS. 31A and 31B show exemplary illustrative non-limiting drawings each illustrating one example of an operation screen for selecting activation/inactivation of wireless communication and non-contact communication according to the present embodiment.
Figure 31B:
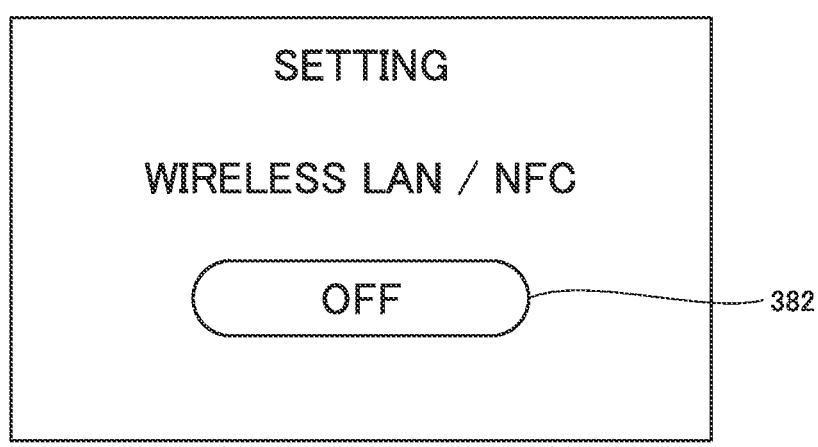

As the user performs an operation in a menu screen or the like, an operation screen 380 for selecting activation/inactivation of wireless communication and non-contact communication is displayed as shown in FIGS. 31A and 31B.

As the user selects an operation object 382 indicating ON in operation screen 380 shown in FIG. 31A, wireless communication and non-contact communication are activated. Communication through wireless communication and non-contact communication may be controlled based on an application. Therefore, activation of wireless communication and non-contact communication may mean supply of power to a module responsible for such communication or setting to such a state that power can be supplied to the module.

On the other hand, as the user selects operation object 382 indicating OFF in operation screen 380 shown in FIG. 31B, wireless communication and non-contact communication are inactivated. Inactivation of wireless communication and non-contact communication means cut-off of power supply to a module responsible for such communication.

By incorporating the function to activate/inactivate such wireless communication and non-contact communication based on software, the user can implement the function with a more simplified operation in such a situation that a state without emission of radio waves should be maintained.

F. Application

One example of an application making use of the function described above will be described.

<f1: Shooting Game>

A shooting game according to the present embodiment will be described. The present shooting game is a game in which the user plays a role as a protagonist in the game and brings down an enemy character which appears in a virtual three-dimensional space (virtual space) prepared as a game world. In the display (for example, upper display module 110 of game device 100), the virtual space implementing the game world is rendered from a point of view of the user. As the user brings the enemy character down, a score is added. In contrast, when an enemy character and the user collide with each other (specifically, the enemy character is within a certain distance from a position of a virtual camera), a score is decreased.

Figure 32:
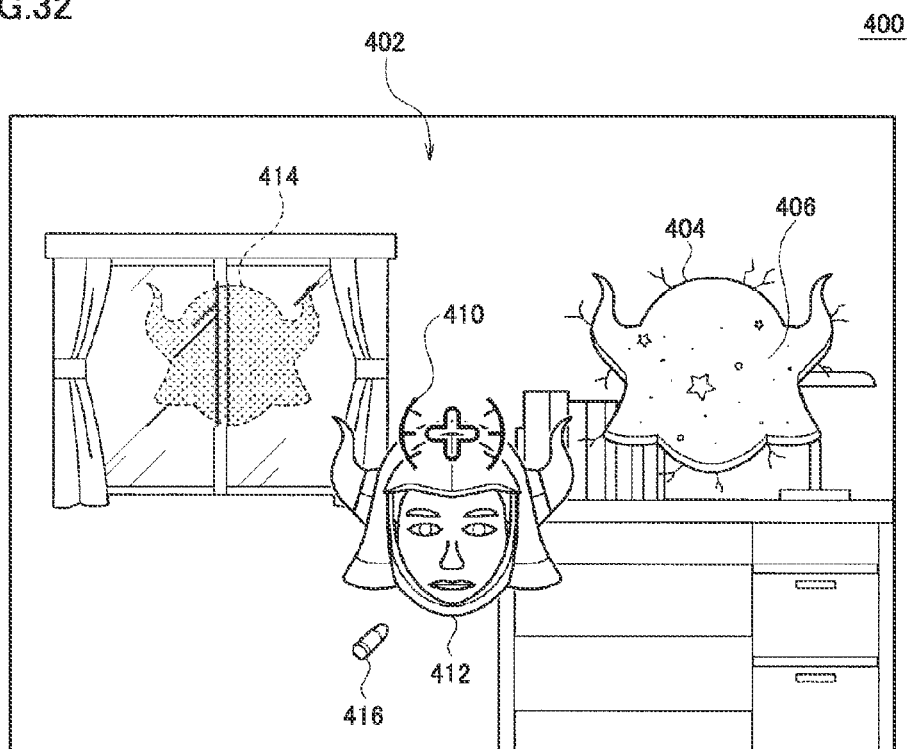
FIG. 32 shows an exemplary illustrative non-limiting drawing illustrating a screen example provided in a shooting game according to the present embodiment.

Referring to FIG. 32, a screen example 400 is generated by combining an image of real world (hereinafter also referred to as a "real world image 402") resulting from image pick-up by the outer camera and a virtual space image expressing the virtual space. More specifically, the virtual space is divided into a region close to the virtual camera (hereinafter also referred to as a "front region") and a region far from the virtual camera (hereinafter also referred to as a "rear region"). An image representing an object present in the front region (in the example shown in FIG. 32, a cursor 410, an enemy character 412, and a bullet object 416) is displayed on a front side of real world image 402, and an image representing an object present in the rear region (in the example shown in FIG. 32, a wall object 406) is displayed behind real world image 402. The object present in the rear region is displayed through an opening 404 provided in a depth position where real world image 402 is present. Namely, the object present in the rear region is rendered only for a region where opening 404 is present. A region of opening 404 is dynamically changed under a prescribed rule depending on progress of the game.

In screen example 400, a silhouette object 414 is displayed, which is a silhouette corresponding to an enemy character 418 (FIG. 33) present in the rear region.

Real world image 402 may be picked up by any camera. Typically, a pair of outer cameras may be used to obtain a pair of input images (an image for left eye and an image for right eye) having a prescribed parallax therebetween. In the description below, however, processing for obtaining real world image 402 using only one of the outer cameras will be described. Namely, stereoscopic display is provided by using a single image resulting from image pick-up of a subject by a single camera.

Figure 33:
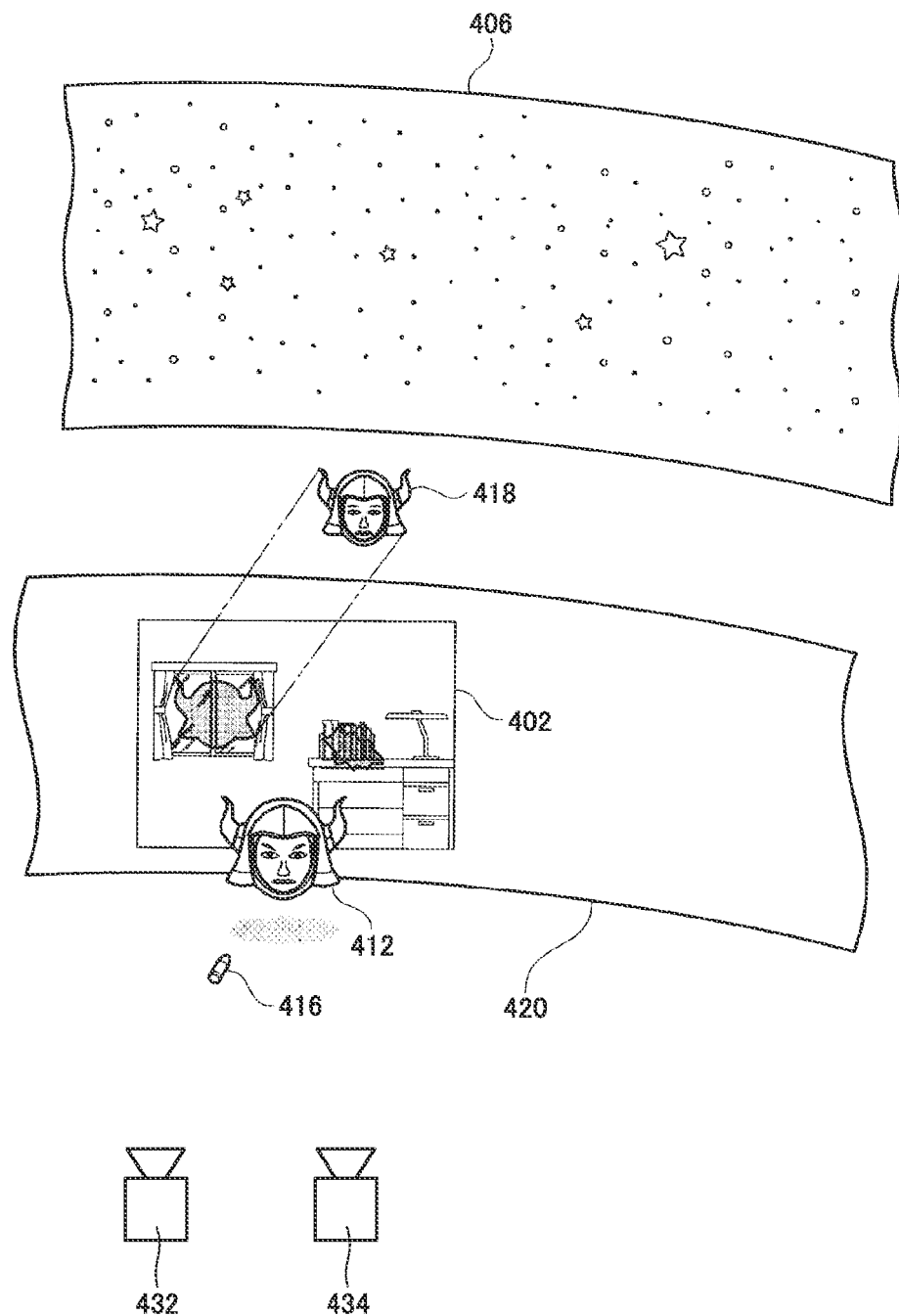
FIG. 33 shows an exemplary illustrative non-limiting drawing illustrating an example of arrangement of each object in the shooting game according to the present embodiment.
Figure 34:
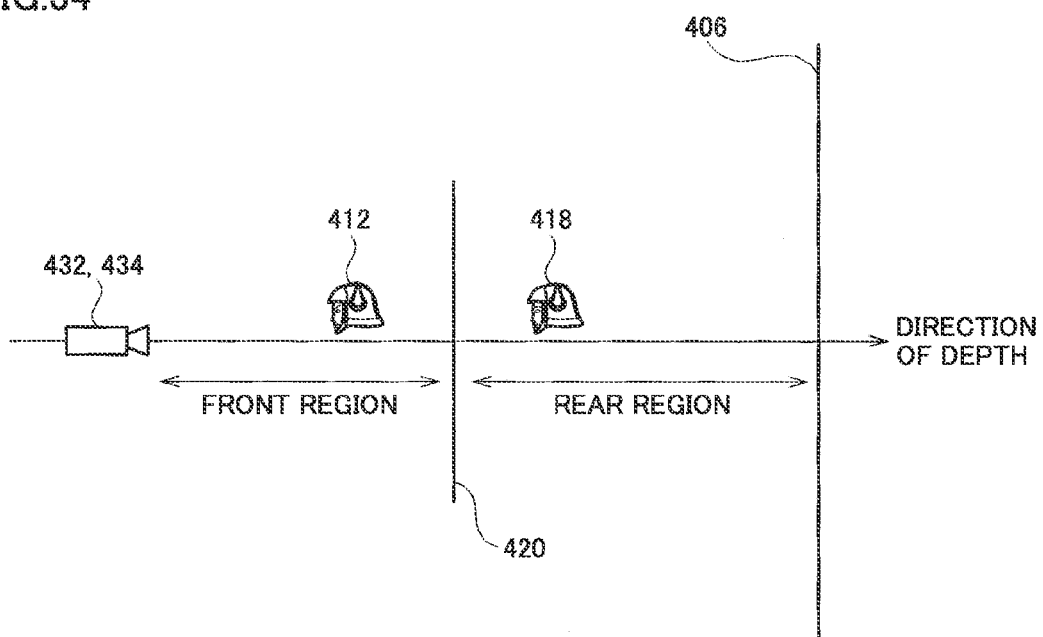
FIG. 34 shows an exemplary illustrative non-limiting drawing illustrating an order of arrangement of each object in a direction of depth in the shooting game according to the present embodiment.

Referring to FIGS. 33 and 34, a boundary surface 420 is provided at a boundary between the front region and the rear region. Boundary surface 420 is associated with information indicating at which position opening 404 (FIG. 32) is present. Though FIG. 33 shows a state that real world image 402 is stuck to boundary surface 420 for the sake of convenience of description, it is not necessarily required to stick real world image 402 to boundary surface 420.

Virtual cameras 432 and 434 virtually pick up images of an object from the front side of boundary surface 420. Enemy character 412 and bullet object 416 as well as not-shown cursor 410 are present between virtual cameras 432 and 434 and boundary surface 420. Wall object 406 is present in the rearmost side in the rear region, and enemy character 418 is present between boundary surface 420 and wall object 406.

As virtual cameras 432 and 434 virtually pick up images of the object, a virtual world image for left eye and a virtual world image for right eye are generated. In the virtual world image for left eye and the virtual world image for right eye, the object present in the front region and the object present in the rear region which can be viewed through opening 404 are represented.

Figure 35:
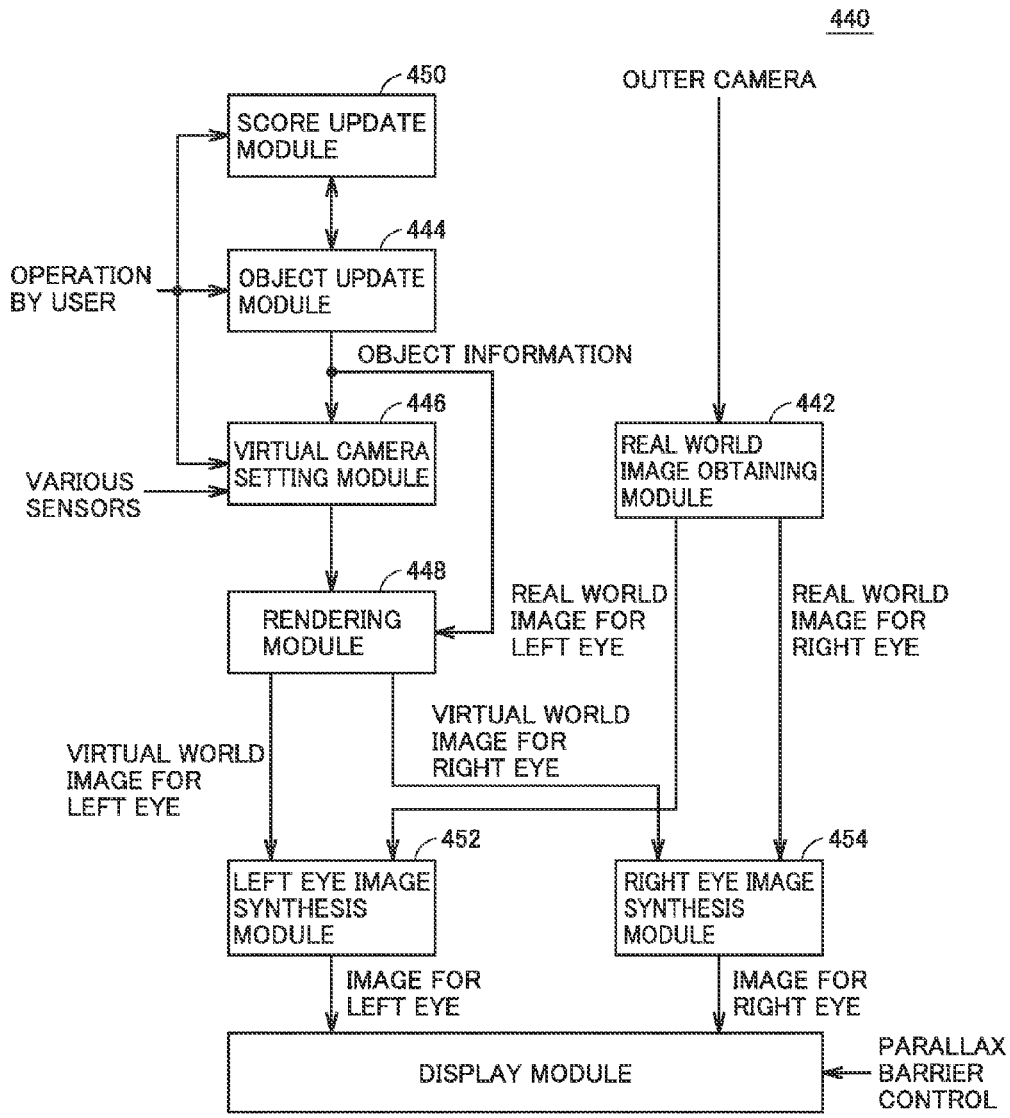
FIG. 35 shows an exemplary illustrative non-limiting functional block diagram illustrating one example in which the shooting game according to the present embodiment is implemented.

FIG. 35 is a functional block diagram showing one example in which a shooting game 440 according to the present embodiment is implemented. Referring to FIG. 35, shooting game 440 is implemented by a real world image obtaining module 442, an object update module 444, a virtual camera setting module 446, a rendering module 448, a score update module 450, a left eye image synthesis module 452, and a right eye image synthesis module 454. Each module shown in FIG. 35 is typically provided as the processor executes a program.

Real world image obtaining module 442 obtains real world image 402 through image pick-up by one outer camera and generates a real world image for left eye and a real world image for right eye as being displaced from each other by a prescribed distance.

Object update module 444 controls generation, movement, and disappearance of an object present in the front region and the rear region in response to an operation by the user. Object update module 444 updates every prescribed cycle, also a size or a position of opening 404 (FIG. 32) present in the boundary surface. Object update module 444 further controls generation, movement, and disappearance of cursor 410 and bullet object 416 (FIG. 32) in response to an operation by the user.

Virtual camera setting module 446 determines positions of virtual cameras 432 and 434 (FIGS. 33 and 34) in response to an operation by the user. Virtual camera setting module 446 senses an inclination of the information processing terminal based on a sensing signal from an acceleration sensor, a gyro sensor, or a geomagnetic sensor and determines orientations of virtual cameras 432 and 434 in accordance with a result of sensing.

Rendering module 448 renders the virtual space with the use of object information from object update module 444 and information on virtual cameras 432 and 434 from virtual camera setting module 446 and generates a virtual world image for left eye and a virtual world image for right eye. Since object update module 444 updates object information as the game progresses, rendering module 448 generates a plurality of display images depending on progress of a game application. Since virtual camera setting module 446 determines orientations of virtual cameras 432 and 434 in accordance with movement of the information processing terminal, rendering module 448 generates a plurality of display images depending on progress of the application making use of movement of the information processing terminal.

Score update module 450 calculates every prescribed cycle, positional relation between bullet object 416 and enemy character 412 and positional relation between enemy character 412 and virtual cameras 432 and 434, and updates a score in accordance with a result of calculation.

Left eye image synthesis module 452 generates an image for left eye by combining the real world image for left eye from real world image obtaining module 442 and the virtual world image for left eye from rendering module 448 with each other.

Right eye image synthesis module 454 generates a right image by combining the real world image for right eye from real world image obtaining module 442 and the virtual world image for right eye from rendering module 448 with each other.

The generated image for left eye and image for right eye are output to the display module. In the display module, the barrier liquid crystal (parallax barrier) is controlled with the use of the barrier control function described above.

In the shooting game according to the present embodiment, a position and a posture of the virtual camera are determined in accordance with an inclination of the information processing terminal (game device 100 or portable information terminal 200). Therefore, the user may considerably incline the information processing terminal during a game and relative positional relation between the display and the user tends to greatly vary. Even in such a case, with the barrier control function according to the present embodiment, optimal stereoscopic display can always be provided to the user and the user can further enjoy the shooting game.

<f2: Camera Use Application>

With a camera use application, an image of a subject can be picked up by using the inner camera or the outer camera, or a picked-up image (a still image or moving images) can be reproduced. When the barrier control function described above is activated, an image of the user should be picked up in a prescribed cycle with the use of the inner camera. Therefore, the barrier control function is activated only when the inner camera is not used.

In order to simplify an image processing engine, in such an implementation that three or more cameras cannot simultaneously be made use of, the barrier control function may be activated only during reproduction of a picked-up image. Even with such an implementation, one inner camera and one outer camera can simultaneously be made use of Therefore, when stereoscopic display is provided by using an image picked up by one outer camera, the barrier control function can be activated by using an image picked up by the inner camera.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A hand-held information processing terminal, comprising:
   a display;
   a camera arranged in proximity to the display and capable of obtaining an image of a user including infrared components;
   an estimation module configured to estimate relative positional relation in a real space between the display and the user based on recognized positions of both of the eyes of the user within the obtained image, the relative positional relation defining information on in which direction the user is located with the camera being defined as a reference and/or how distant the user is located;
   a generation module configured to generate a plurality of display images in accordance with the relative positional relation;
   a control module configured to provide stereoscopic display to the user in accordance with a position of the user with the plurality of display images; and
   a dimming module configured to adjust brightness of the display in accordance with a state of an ambient environment at which the user using the information processing terminal is positioned, based on the obtained image.

2. The information processing terminal according to claim 1, wherein
   the display has an adjustable parallax barrier, and
   the control module provides stereoscopic display to the user in accordance with the position of the user by adjusting at least one of a position, a width, and an interval of the parallax barrier.

3. The information processing terminal according to claim 1, wherein
   the generation module generates the plurality of display images based on image pick-up of an object arranged in a virtual space by a plurality of virtual cameras arranged at positions in accordance with the relative positional relation.

4. The information processing terminal according to claim 3, wherein
   the generation module has the plurality of virtual cameras turned in accordance with the relative positional relation, with a point of regard in the virtual space being defined as a reference.

5. The information processing terminal according to claim 3, wherein
   the generation module has the plurality of virtual cameras moved in accordance with the relative positional relation in a direction in parallel to a plane including the point of regard in the virtual space.

6. The information processing terminal according to claim 1, wherein the generation module and the control module both use relative positional relation estimated by the estimation module.

7. The information processing terminal according to claim 1, wherein
   the generation module generates the plurality of display images depending on progress of a game application.

8. The information processing terminal according to claim 1, wherein
   the generation module generates the plurality of display images depending on progress of an application making use of movement of the information processing terminal.

9. The information processing terminal according to claim 1, further comprising an infrared ray emission portion configured to emit infrared rays when the camera picks up an image of the user.

10. The information processing terminal according to claim 9, wherein
    the camera has a band pass filter for obtaining an image in an infrared wavelength region having a band substantially equal to a band of infrared rays emitted by the infrared ray emission portion.

11. A hand-held information processing terminal, comprising:
    a display;
    a camera arranged in proximity to the display;
    an estimation module configured to estimate relative positional relation in a real space between the display and a user based on recognized positions of both of the eyes of the user within an image obtained by the camera, the relative positional relation defining information on in which direction the user is located with the camera being defined as a reference and/or how distant the user is located; and
    a generation module configured to generate a plurality of display images based on image pick-up of an object arranged in a virtual space by a plurality of virtual cameras arranged at positions in accordance with the relative positional relation,
    the generation module configured to have the plurality of virtual cameras turned in accordance with the relative positional relation while a distance from a predetermined point of regard in the virtual space is maintained constant,
    the distance from the point of regard being different depending on an application to be executed; and
    a dimming module configured to adjust brightness of the display in accordance with a state of an ambient environment at which the user using the information processing terminal is positioned, based on the obtained image.

12. A hand-held information processing terminal, comprising:
    a display;
    a camera arranged in proximity to the display;
    an estimation module configured to estimate relative positional relation in a real space between the display and a user based on recognized positions of both of the eyes of the user within an image obtained by the camera, the relative positional relation defining information on in which direction the user is located with the camera being defined as a reference and/or how distant the user is located; and
    a generation module configured to generate a plurality of display images based on image pick-up of an object arranged in a virtual space by a plurality of virtual cameras arranged at positions in accordance with the relative positional relation,
    the generation module configured to have the plurality of virtual cameras moved in accordance with the relative positional relation,
    an amount of movement in accordance with the relative positional relation of the plurality of virtual cameras being different depending on an application to be executed; and a dimming module configured to adjust brightness of the display in accordance with a state of an ambient environment at which the user using the information processing terminal is positioned, based on the obtained image.

13. A non-transitory storage medium encoded with a computer readable information processing program executed by a computer of a hand-held information processing terminal having a display and a camera arranged in proximity to the display and capable of obtaining an image of a user including infrared components, the information processing program causing the computer to perform functionality comprising:

estimating relative positional relation in a real space between the display and the user based on recognized positions of both of the eyes of the user within the obtained image, the relative positional relation defining information on in which direction the user is located with the camera being defined as a reference and/or how distant the user is located;

generating a plurality of display images in accordance with the relative positional relation;

providing stereoscopic display to the user in accordance with a position of the user with the plurality of display images; and adjusting brightness of the display in accordance with a state of an ambient environment at which the user using the information processing terminal is positioned, based on the obtained image.

14. An information processing system having at least one hand-held information processing terminal, comprising:

a display;

a camera arranged in proximity to the display and capable of obtaining an image of a user including infrared components;

an estimation module configured to estimate relative positional relation in a real space between the display and the user based on recognized positions of both of the eyes of the user within the obtained image, the relative positional relation defining information on in which direction the user is located with the camera being defined as a reference and/or how distant the user is located;

a generation module configured to generate a plurality of display images in accordance with the relative positional relation;

a control module configured to provide stereoscopic display to the user in accordance with a position of the user with the plurality of display images; and a dimming module configured to adjust brightness of the display in accordance with a state of an ambient environment at which the user using the information processing terminal is positioned, based on the obtained image.

15. An information processing method performed by a computer of a hand-held information processing terminal having a display and a camera arranged in proximity to the display and capable of obtaining an image of a user including infrared components, comprising:

estimating relative positional relation in a real space between the display and the user based on recognized positions of both of the eyes of the user within the obtained image, the relative positional relation defining information on in which direction the user is located with the camera being defined as a reference and/or how distant the user is located;

generating a plurality of display images in accordance with the relative positional relation;

providing stereoscopic display to the user in accordance with a position of the user with the plurality of display images; and adjusting brightness of the display in accordance with a state of an ambient environment at which the user using the information processing terminal is positioned, based on the obtained image.

* * * * *